United States Patent
Varekamp et al.

(10) Patent No.: US 11,189,079 B2
(45) Date of Patent: Nov. 30, 2021

(54) PROCESSING OF 3D IMAGE INFORMATION BASED ON TEXTURE MAPS AND MESHES

(71) Applicant: KONINKLIJKE PHILIPS N.V., Eindhoven (NL)

(72) Inventors: Christiaan Varekamp, Veldhoven (NL); Bart Kroon, Eindhoven (NL); Patrick Luc Els Vandewalle, Oud-Turnhout (BE)

(73) Assignee: Koninklijke Philips N.V., Eindhoven (NL)

( * ) Notice: Subject to any disclaimer, the term of this patent is extended or adjusted under 35 U.S.C. 154(b) by 7 days.

(21) Appl. No.: 16/622,996

(22) PCT Filed: Jun. 19, 2018

(86) PCT No.: PCT/EP2018/066159
§ 371 (c)(1),
(2) Date: Dec. 16, 2019

(87) PCT Pub. No.: WO2018/234258
PCT Pub. Date: Dec. 27, 2018

(65) Prior Publication Data
US 2021/0150802 A1    May 20, 2021

(30) Foreign Application Priority Data
Jun. 23, 2017   (EP) ..................... 17177649

(51) Int. Cl.
*G06T 15/00* (2011.01)
*G06T 15/20* (2011.01)
(Continued)

(52) U.S. Cl.
CPC .............. *G06T 15/20* (2013.01); *G06T 15/04* (2013.01); *G06T 17/20* (2013.01); *G06T 2200/04* (2013.01)

(58) Field of Classification Search
CPC ........ G06T 9/001; H04N 19/27; H04N 19/23; H04N 19/30
(Continued)

(56) References Cited

U.S. PATENT DOCUMENTS 6,124,864 A  *  9/2000 Madden .................. G06T 17/00
345/420
9,482,528 B2 * 11/2016 Baker .................. H04N 13/221
(Continued)

FOREIGN PATENT DOCUMENTS

WO    2018104102 A1    6/2018

OTHER PUBLICATIONS

Fu Y, Yan Q, Yang L, Liao J, Xiao C. Texture mapping for 3d reconstruction with rgb-d sensor. InProceedings of the IEEE conference on computer vision and pattern recognition 2018 (pp. 4645-4653). (Year: 2018).*

(Continued)

*Primary Examiner* — Phu K Nguyen

(57) ABSTRACT

An apparatus comprises a receiver (201) for receiving an image signal comprising a number of three dimensional images representing a scene from different viewpoints, each three dimensional image comprising a mesh and a texture map, the signal further comprising a plurality of residual data texture maps for a first viewpoint being different from the different viewpoints of the number of three dimensional images, a first residual data texture map of the plurality of residual texture maps providing residual data for a texture map for the first viewpoint relative to a texture map resulting from a viewpoint shift of a first reference texture map being a texture map of a first three dimensional image of the number of three dimensional images and a second residual data texture map of the plurality of residual texture maps (Continued)

providing residual data for a texture map for the first viewpoint relative to a texture map resulting from a viewpoint shift of a second reference texture map being a texture map of a second three dimensional image of the number of three dimensional images. A mesh processor (203) generates a first mesh for the first viewpoint and a second mesh for the first viewpoint from an additional reference mesh being a mesh of the second three dimensional image of the plurality of three dimensional images. A first texture processor (205) generates a first intermediate texture map in response to a viewpoint transformation of the first reference texture map from a viewpoint of the first three dimensional image to the first viewpoint and an second intermediate texture map in response to a viewpoint transformation of the second reference texture map from a viewpoint of the second three dimensional image to the first viewpoint. A second texture processor (207) generates a first texture map in response to a combination of the first intermediate texture map and the first residual data texture map, and a second texture map in response to a combination of the second intermediate texture map and the second additional residual data texture map. An image generator (209) generates an image for a second viewpoint from the first texture map, the first mesh, the second texture map, and the second mesh.

19 Claims, 9 Drawing Sheets

(51) Int. Cl.
    *G06T 15/04*     (2011.01)
    *G06T 17/20*     (2006.01)
(58) Field of Classification Search
    USPC .......................................................... 345/418
    See application file for complete search history.

(56) References Cited

U.S. PATENT DOCUMENTS

| | | | | |
|---|---|---|---|---|
| 9,922,432 | B1 * | 3/2018 | Risser | G06T 11/00 |
| 10,026,218 | B1 * | 7/2018 | Mertens | G06T 17/00 |
| 10,163,247 | B2 * | 12/2018 | Romea | G06T 15/00 |
| 10,424,087 | B2 * | 9/2019 | Risser | G06T 11/001 |
| 10,484,697 | B2 * | 11/2019 | Grasmug | G06T 9/001 |
| 10,699,466 | B2 | 6/2020 | Varekamp | |
| 2007/0086645 | A1 | 4/2007 | Kim et al. | |
| 2009/0185759 | A1 | 7/2009 | Liu et al. | |
| 2011/0255592 | A1 | 10/2011 | Sung et al. | |
| 2012/0229607 | A1 * | 9/2012 | Baker | G01C 11/00 348/46 |
| 2016/0073117 | A1 * | 3/2016 | Grasmug | H04N 19/27 375/240.26 |
| 2017/0018111 | A1 * | 1/2017 | Collet Romea | G06T 15/00 |
| 2020/0413097 | A1 * | 12/2020 | Kroon | H04N 21/21805 |

OTHER PUBLICATIONS

Han X, Laga H, Bennamoun M. Image-based 3D object reconstruction: State-of-the-art and trends in the deep learning era. IEEE transactions on pattern analysis and machine intelligence. Nov. 21, 2019. (Year: 2019).*

Jeon J, Jung Y, Kim H, Lee S. Texture map generation for 3D reconstructed scenes. The Visual Computer. Jun. 2016;32(6):955-65. (Year: 2016).*

International Search Report and Written Opinion from PCT/EP2018/066159 dated Sep. 11, 2018.

Smolic et al "Free Viewpoint Video Extraction Representation Coding and Rendering" Image Processing 2004 ICIP 2004 International Conference on Singapore Oct. 24-27, 2004 vol. 5 p. 3287-3290.

\* cited by examiner

PROCESSING OF 3D IMAGE INFORMATION BASED ON TEXTURE MAPS AND MESHES

CROSS-REFERENCE TO PRIOR APPLICATIONS

This application is the U.S. National Phase application under 35 U.S.C. § 371 of International Application No. PCT/EP2018/066159, filed on Jun. 19, 2018, which claims the benefit of EP Patent Application No. EP 17177649.5, filed on Jun. 23, 2017. These applications are hereby incorporated by reference herein.

FIELD OF THE INVENTION

The invention relates to representation of three dimensional image data/information using texture maps and meshes, and in particular, but not exclusively, to generation, encoding, and processing of an image signal comprising a number of three dimensional images each represented by a texture map and a mesh.

BACKGROUND OF THE INVENTION

Traditionally, technical processing and use of images has been based on two-dimensional imaging but increasingly the third dimension is being explicitly considered in image processing.

For example, three dimensional (3D) displays have been developed which add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In some situations and systems, 3D models are used to represent 3D scenes with the models being evaluated in order to generate appropriate view images. A multi-view with depth representation of a scene may be used as an alternative to traditional 3D models or as an addition to 3D models. This format typically results from capturing a scene with multiple stereo cameras. Given multiple camera images with associated depth maps taken at different positions, a new virtual view image may be synthesized using depth image based rendering. This allows for virtual reality playback of captured images or video where the observer can to some extend change his/her viewpoint.

Graphic applications based on three-dimensional scenes have become prevalent in many applications such as specifically computer graphics applications. In order to support fast three-dimensional graphics processing, a number of standards and specifications have been developed. This not only provides faster design and implementation as it may provide standardized functions and routines for many standard operations, such as viewpoint shifting, but also allows for dedicated hardware graphic engines to be developed and optimized for these routines. Indeed, for many computers, the Graphics Processing Unit (GPU) may nowadays often be at least as powerful and important as the Central Processing Unit (CPU).

An example of a standard for supporting fast graphics processing is the OpenGL specification which provides an Applicant Programming Interface (API) with a number of functions supporting graphics processing. The specification is typically used to provide hardware accelerated graphics processing with the specific routines being implemented by dedicated accelerated hardware in the form of a GPU.

In most such graphics specifications, the representation of the scene is by a combination of a texture map and a three-dimensional mesh. Indeed, a particularly effective approach in many scenarios is to represent image objects, or indeed the scene as a whole, by a polygon mesh where a set of polygons are connected by their common edges or corners (vertices), which are given by three-dimensional positions. The combined three-dimensional polygon mesh accordingly provides an effective model of three-dimensional objects, including possibly a three-dimensional description of an entire image. The polygon mesh is often a triangle mesh formed by triangles having common corners given in 3D space.

In practice, depth maps are accordingly often converted to a 3D mesh. The 3D mesh is a well-known graphics format that is supported by most hardware drivers (e.g. based on OpenGL).

As an example, a stereo camera may record an image of a scene from a given viewpoint. For each pixel, a disparity estimation may be performed to estimate the distance to the object represented by the pixel. This may be performed for each pixel thereby providing a three-dimensional position of x, y, z for each pixel. These positions may then be used as vertices for a triangle mesh with two triangles being formed for each group of 2×2 pixels. As this may result in a large number of triangles, the process may include combining some initial triangles into larger triangles (or in some scenarios more generally into larger polygons). This will reduce the number of triangles but also decrease the spatial resolution of the mesh. Accordingly, the granularity of the mesh is typically dependent on the depth variations and larger polygons predominantly occur in flatter areas.

Each vertex is further associated with a light intensity value of the texture map. The texture map essentially provides the light/color intensity in the scene for the object at the pixel position for the vertex. Typically, a light intensity image/texture map is provided together with the mesh with each vertex containing data representing the x, y, z position of the vertex and u,v data identifying a linked position in the texture map, i.e. it points to the light intensity at the x, y, z position as captured in the texture map.

In such representations, the polygon mesh is used to provide information of the three-dimensional geometry of the objects whereas the texture is typically provided as a separate data structure. Specifically, the texture is often provided as a separate two-dimensional map, which by the processing algorithm can be overlaid on the three-dimensional geometry.

The use of triangle meshes is particularly suitable for processing and manipulation by computer graphics algorithms, and many efficient software and hardware solutions have been developed and are available in the market. A substantial computational efficiency is in many of the systems achieved by the algorithm processing the individual vertices commonly for a plurality of polygons rather than processing each polygon separately. For example, for a typical triangle mesh, the individual vertex is often common to several (often 3-8) triangles. The processing of a single vertex may accordingly be applicable to a relatively high number of triangles thereby substantially reducing the number of points in an image or other object that is being processed.

As a specific example, many current Systems on Chips (SoCs) contain a GPU which is highly optimized for processing of 3D graphics. For instance, the processing of 3D object geometry and 3D object texture is done using two largely separate paths in the so called OpenGL rendering pipeline (or in many other APIs such as DirectX). The hardware of GPUs on SoCs can deal efficiently with 3D graphics as long as the 3D source is presented to the GPU in the form of vertices (typically of triangles) and textures. The OpenGL application interface then allows setting and control of a virtual perspective camera that determines how 3D objects appear as projected on the 2D screen. Although OpenGL uses 3D objects as input, the output is typically a 2D image suitable for a normal 2D display.

However, such approaches require the three-dimensional information to be provided by a polygon mesh and associated texture information. Whereas this may be relatively easy to provide in some applications, such as e.g. games based on fully computer generated virtual scenes and environments, it may be less easy in other embodiments. In particular, in applications that are based on capturing real scenes, it requires that these are converted into a texture and mesh representation. This may, as previously mentioned, be based on stereo images or on an image and depth representation of the scene.

A common operation in graphics processing is viewpoint changes where an image is generated for a different viewpoint than that of the input texture map and mesh. Graphics APIs typically have functions for efficiently performing such viewpoint transformations. However, as the input mesh typically is not perfect, such viewpoint transformations may result in quality degradation if the shift is too significant. Further, a representation of a scene from a viewpoint will typically include a number of occluded elements where a foreground object occludes elements behind it. These elements may be visible from the new direction, i.e. the viewpoint change may result in de-occlusion. However, the input texture map and mesh will in such a case not comprise any information for these de-occluded parts. Accordingly, they cannot be optimally represented as the required information is not available. View-synthesis errors and inaccuracies tend to increase with increasing distance of the new shift.

In many applications, 3D information of a scene is communicated from a source to a destination, such as for example from a server to a client device. An example of such a situation is a virtual reality application wherein a 3D model or representation of a scene or environment is stored at a server. This virtual reality server may support one or more client virtual reality devices which may receive 3D information from the virtual reality server and based on this information may generate a local view image corresponding to a specific viewpoint. The 3D information from the virtual reality server may be provided in the form of a data signal or stream which comprises a number of 3D images or representations corresponding to specific viewpoints, where each 3D image may be represented by a matching texture map and mesh. These 3D images may be referred to as anchor images or views (or just anchors).

However, as the viewpoint transformation quality tends to decrease for an increasing distance of the view transformation, a high spatial density of anchor views is desired, and indeed is typically needed in practice in order to achieve sufficiently accurate view-synthesis. As a consequence, the amount of data that needs to be streamed from e.g. a virtual reality server to a client VR device will tend to be high. In general, in order to achieve a high accuracy and quality of the resulting images from view transformation based on a received data stream comprising anchor images, a high data rate data stream is required. However, this complicates distribution, storage, encoding/decoding, and processing of the data stream.

Hence, an improved approach would be advantageous and especially an improved approach for communicating three dimensional image data supporting destination end view generation and shifting based on texture maps and meshes would be desirable. In particular, an approach allowing increased flexibility, increased accuracy, reduced complexity, improved computational efficiency, improved compatibility with existing graphic processing approaches, improved image quality, reduced data rate, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating an image, the apparatus comprising: a receiver for receiving an image signal comprising a number of three dimensional images representing a scene from different viewpoints, each three dimensional image comprising a mesh and a texture map, the signal further comprising a plurality of residual data texture maps for a first viewpoint being different from the different viewpoints of the number of three dimensional images, a first residual data texture map of the plurality of residual texture maps providing residual data for a texture map for the first viewpoint relative to a texture map resulting from a viewpoint shift of a first reference texture map being a texture map of a first three dimensional image of the number of three dimensional images and a second residual data texture map of the plurality of residual texture maps providing residual data for a texture map for the first viewpoint relative to a texture map resulting from a viewpoint shift of a second reference texture map being a texture map of a second three dimensional image of the number of three dimensional images; a mesh processor for generating a first mesh for the first viewpoint and generating a second mesh for the first viewpoint from an additional reference mesh being a mesh of the second three dimensional image of the plurality of three dimensional images; a first texture processor for generating a first intermediate texture map in response to a viewpoint transformation of the first reference texture map from a viewpoint of the first three dimensional image to the first viewpoint and an second intermediate texture map in response to a viewpoint transformation of the second reference texture map from a viewpoint of the second three dimensional image to the first viewpoint; a second texture processor for generating a first texture map in response to a combination of the first intermediate texture map and the first residual data texture map, and generating a second texture map in response to a combination of the second intermediate texture map and the second additional residual data texture map; and an image generator for generating an image for a second viewpoint from the first texture map, the first mesh, the second texture map, and the second mesh.

The invention may provide improved distribution of three dimensional image information in many scenarios. In many embodiments, an improved encoding may be achieved and in particular an improved quality to data rate can be achieved. The approach may in many embodiments allow an improved image to be received from the received 3D information. Further, this may be achieved while typically maintaining relatively low complexity and a high degree of computational efficiency. In particular, the approach may typically support the efficient use of e.g. dedicated, standardized, and optimized hardware. For example, many platforms developed for computer graphics processing may be used to support steps of the processing.

A particular advantage of the approach is that it may in many embodiments be closely supported by standard graphic routines. For example, the view point transformations may in many embodiments be performed by standardized, dedicated, and optimized graphic processing hardware. For example, the approach may be compatible with standardized graphic processes and may utilize these efficiently. Indeed, the approach may be compatible with such standardized approaches, such as e.g. the OpenGL specification, by limiting non-standard approaches to parts of the rendering/processing pipeline which allows user adaptation. E.g. the combination may be performed as part of the fragment shader stage of an OpenGL rendering pipeline.

The possibility of using standardized hardware accelerated processing for resource intensive elements of the processing may substantially increase e.g. the speed or capacity of the system. It may reduce the complexity and or resource requirements in many embodiments.

A mesh may be a three dimensional mesh wherein each vertex is associated with (has) a three dimensional position. Each vertex may specifically be represented by at least a three dimensional spatial position x, y, z. Each vertex of a mesh may further be linked with a position in the corresponding texture map. For example, for each vertex, a position u,v in the texture map corresponding to the spatial position x, y, z may be stored.

A mesh may include information relating to the depths of the represented objects but is not limited thereto (e.g. as described, vertices may be represented by three dimensional coordinates rather than merely by a depth coordinate).

A mesh can also be referred to as a 3D mesh or a depth mesh.

The first mesh may in some embodiments directly be a mesh for the first viewpoint extracted from the image signal. In some embodiments, the first mesh may be e.g. a reference mesh being a mesh for the first three dimensional image. Thus, in some embodiments, a received reference mesh for a reference viewpoint may be considered as a suitable approximation or estimation of the mesh for the first viewpoint.

In many embodiments, the mesh processor may be arranged to generate the first mesh from a reference mesh being a mesh of the first three dimensional image. In particular, in many embodiments, the mesh processor may be arranged to generate the first mesh in response to a viewpoint transformation of a reference mesh being a mesh of the first three dimensional image.

The residual data may be any data indicative of a difference between the texture map for the first viewpoint and the texture map resulting from the viewpoint shift of the reference texture map. The first residual data texture map may provide residual data for a texture map for the first viewpoint relative to a texture map resulting from a viewpoint shift of the first reference texture map from a viewpoint of the first three dimensional image to the first viewpoint. Similarly, the second residual data texture map may provide residual data for a texture map for the first viewpoint relative to a texture map resulting from a viewpoint shift of the second reference texture map from a viewpoint of the second three dimensional image to the first viewpoint.

In many embodiments, the image generator is arranged to generate the image in response to a viewpoint transformation from the first viewpoint to the second viewpoint based on the first texture map, the first mesh, the second texture map, and the second mesh.

The number of three dimensional images comprised in the image signal may be one but is in many embodiments a plurality of three dimensional images, such as no less than 2, 3 or 5 images.

In accordance with an optional feature of the invention, the image signal further comprises mesh residual data for a mesh for the first viewpoint with reference to a reference mesh being a mesh of the first three dimensional image, and the mesh processor is arranged to generate the first mesh in response to the mesh residual data and the reference mesh.

This may tend to provide improved quality of the generated image while still allowing low complexity and efficient processing and image signal distribution.

In many embodiments, the mesh residual data for a mesh for the first viewpoint is relative to a mesh derived from the reference mesh.

In some embodiments, the mesh residual data comprises residual data for the mesh for the first viewpoint relative to an intermediate mesh resulting from a viewpoint transformation of the reference mesh.

This may tend to provide improved quality of the generated image while still allowing low complexity and efficient processing and image signal distribution.

In accordance with an optional feature of the invention, the mesh residual data comprises residual data for only a subset of vertices of the mesh for the first viewpoint.

This may in many embodiments allow a reduced data rate of the image signal while still maintaining a sufficiently high quality.

In accordance with an optional feature of the invention, the image signal comprises no mesh data for the first viewpoint.

This may in many embodiments allow a reduced data rate of the image signal while still maintaining sufficiently high quality. In particular, it may allow for a very efficient combination of view synthesis/transformation based on using fully encoded reference 3D images represented by both texture information and mesh information combined with relatively encoded images that are represented by only a residual texture map. The approach may exploit insights into the relative encoding requirements, psychovisual impact, and estimation and processing efficiency of different elements of 3D images.

In accordance with an optional feature of the invention, the image signal comprises mesh generation control data; and the mesh processor is arranged to generate the first mesh in response to the mesh generation control data.

This may allow for improved and adapted mesh generation/transformation typically resulting in improved quality of the generated image.

In accordance with an optional feature of the invention, the image signal comprises a plurality of residual data texture maps and metadata indicative of three dimensional images linked to the residual data texture maps.

This may allow an efficient operation. Each residual data texture map of the plurality of residual data texture maps may be for a given viewpoint being different from the different viewpoints of the number of three dimensional images, the residual data texture map for a given viewpoint providing residual data for a texture map for the given viewpoint relative to a texture map resulting from a viewpoint shift of a given reference texture map being a texture map of a first three dimensional image of the number of three dimensional images In accordance with an optional feature of the invention, the image generator is arranged to generate a first intermediate image for the second viewpoint in response to the first texture map and the first mesh, generate a second intermediate image for the second viewpoint in response to an additional texture map and an additional mesh for an additional viewpoint; and to generate the image by combining the first intermediate image and the second intermediate image.

This may provide a particularly efficient and flexible approach and may result in an improved image generation in many embodiments.

In many embodiments, the additional texture map and the additional mesh is a texture map and a mesh of a three dimensional image of the number of three dimensional images.

In many embodiments the first texture processor is arranged to generate an additional intermediate texture map in response to a viewpoint transformation of an additional reference texture map from a viewpoint of the additional reference texture map to the additional viewpoint, the additional reference texture map being a texture map of the second three dimensional image of the number of three dimensional images; and the second texture processor is arranged to generate the additional texture map in response to a combination of the additional intermediate texture map and an additional residual data texture map for the additional viewpoint, the additional residual data texture map being for the second three dimensional image.

In many embodiments, the mesh processor is arranged to generate the additional mesh in response to a viewpoint transformation of a mesh of the second three dimensional image from a viewpoint of the additional reference texture map to the additional viewpoint.

In accordance with an optional feature of the invention, the image generator is arranged to generate a first intermediate image for the second viewpoint in response to a viewpoint transformation from the first viewpoint to the second viewpoint based on the first texture map and the first mesh, a second intermediate image for the second viewpoint in response to a viewpoint transformation from the first viewpoint to the second viewpoint based on the second texture map and the second mesh; and to generate the image by combining the first intermediate image and the second intermediate image.

This may provide a particularly efficient and flexible approach and may result in an improved image generation in many embodiments.

In accordance with an optional feature of the invention, the image generator is arranged to combine the first intermediate image and the second intermediate image in response to occlusion data associated with a viewpoint of at least one of the first three dimensional image and the second three dimensional image.

This may provide a particularly efficient and flexible approach and may result in an improved image generation in many embodiments.

In many embodiments, the image generator is arranged to combine the first intermediate image and the second intermediate image in response to a direction of viewpoint shifts from the viewpoints of respectively the first three dimensional image and the second three dimensional image to the first viewpoint relative to a direction of viewpoint shift from the first viewpoint to the second viewpoint.

In accordance with an optional feature of the invention, the image generator is arranged to combine the first texture map and the second texture map into a third texture map for the first viewpoint, and to combine the first mesh and the second mesh into a third mesh for the first viewpoint; and to generate the image in response to a viewpoint transformation from the first viewpoint to the second viewpoint based on the third texture mesh and the third mesh.

This may provide a particularly efficient and flexible approach and may result in an improved image generation in many embodiments.

In some embodiments, the mesh processor may be arranged to filter the first mesh.

This may provide a particularly efficient and flexible approach and may result in an improved image generation in many embodiments.

According to an aspect of the invention there is provided an apparatus for generating an image signal, the apparatus comprising: a receiver for receiving a number of three dimensional images representing a scene from different viewpoints; each three dimensional image comprising a mesh and a texture map, and for receiving a first texture map for a first viewpoint being different from the different viewpoints of the three dimensional images; a view shift processor for generating a first intermediate texture map in response to a viewpoint transformation of a first reference texture map from a first three dimensional image of the number of three dimensional images to the first viewpoint, and a second intermediate texture map in response to a viewpoint transformation of a second reference texture map from a second three dimensional image of the number of three dimensional images to the first viewpoint; a residual processor arranged to generate a first residual data texture map in response to a comparison of the first intermediate texture map and the first texture map and a second residual data texture map in response to a comparison of the second intermediate texture map and the first texture map, the first residual data texture map being indicative of a difference between the first intermediate texture map and the first texture map and the second residual data texture map being indicative of a difference between the second intermediate texture map and the first texture map; and a signal generator for generating the image signal to comprise the number of three dimensional images, the first residual data texture map, and the second residual data texture map but not the first texture map.

According to an aspect of the invention there is provided a method of generating an image, the method comprising: receiving an image signal comprising a number of three dimensional images representing a scene from different viewpoints, each three dimensional image comprising a mesh and a texture map, the signal further comprising a plurality of residual data texture maps for a first viewpoint being different from the different viewpoints of the number of three dimensional images, a first residual data texture map of the plurality of residual texture maps providing residual data for a texture map for the first viewpoint relative to a texture map resulting from a viewpoint shift of a first reference texture map being a texture map of a first three dimensional image of the number of three dimensional images and a second residual data texture map of the plurality of residual texture maps providing residual data for a texture map for the first viewpoint relative to a texture map resulting from a viewpoint shift of a second reference texture map being a texture map of a second three dimensional image of the number of three dimensional images; generating a first mesh for the first viewpoint and generating a second mesh for the first viewpoint from an additional reference mesh being a mesh of the second three dimensional image of the plurality of three dimensional images; generating a first intermediate texture map in response to a viewpoint transformation of the first reference texture map from a viewpoint of the first three dimensional image to the first viewpoint and an second intermediate texture map in response to a viewpoint transformation of the second reference texture map from a viewpoint of the second three dimensional image to the first viewpoint; generating a first texture map in response to a combination of the first intermediate texture map and the first residual data texture map, and generating a second texture map in response to a combination of the second intermediate texture map and the second additional residual data texture map; and generating an image for a second viewpoint from the first texture map, the first mesh, the second texture map, and the second mesh.

According to an aspect of the invention there is provided a method of generating an image signal, the method comprising: receiving a number of three dimensional images representing a scene from different viewpoints; each three dimensional image comprising a mesh and a texture map, and for receiving a first texture map for a first viewpoint being different from the different viewpoints of the three dimensional images; generating a first intermediate texture map in response to a viewpoint transformation of a first reference texture map from a first three dimensional image of the number of three dimensional images to the first viewpoint, and a second intermediate texture map in response to a viewpoint transformation of a second reference texture map from a second three dimensional image of the number of three dimensional images to the first viewpoint; generating a first residual data texture map in response to a comparison of the first intermediate texture map and the first texture map and a second residual data texture map in response to a comparison of the second intermediate texture map and the first texture map, the first residual data texture map being indicative of a difference between the first intermediate texture map and the first texture map and the second residual data texture map being indicative of a difference between the second intermediate texture map and the first texture map; and generating the image signal to comprise the number of three dimensional images, the first residual data texture map, and the second residual data texture map but not the first texture map.

According to an aspect of the invention there is provided an image signal comprising a number of three dimensional images representing a scene from different viewpoints, each three dimensional image comprising a mesh and a texture map, the signal further comprising a first residual data texture map and a second residual data texture map for a first viewpoint being different from the different viewpoints of the number of three dimensional images, the first residual data texture map providing residual data for a texture map for the first viewpoint relative to a texture map resulting from a viewpoint shift of a first reference texture map being a texture map of a first three dimensional image of the number of three dimensional images and the second residual data texture map providing residual data for a texture map for the first viewpoint relative to a texture map resulting from a viewpoint shift of a second reference texture map being a texture map of a second three dimensional image of the number of three dimensional images.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
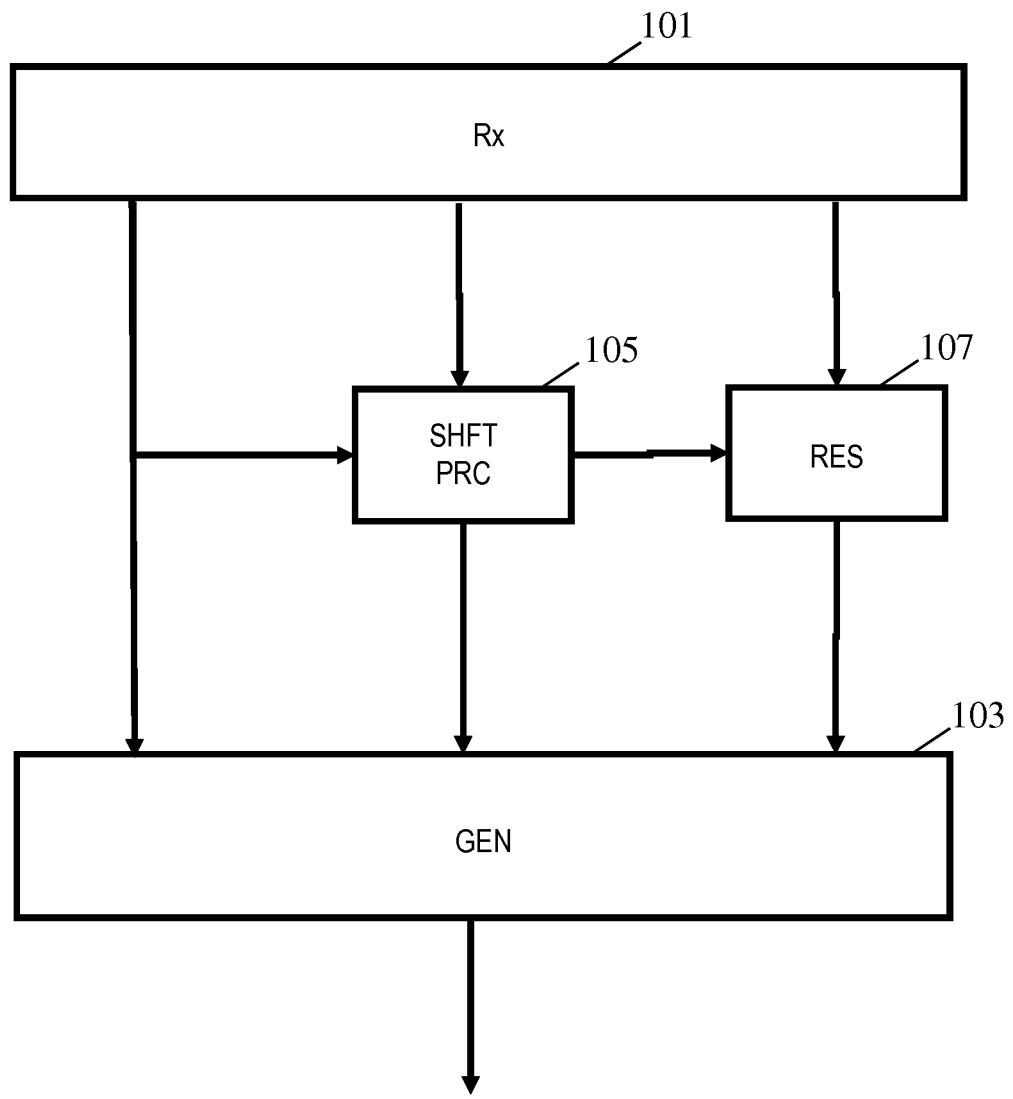
FIG. 1 illustrates an example of elements of an apparatus for generating an image signal in accordance with some embodiments of the invention.

FIG. 1 illustrates an example of an apparatus for generating a 3D image signal. The apparatus, and indeed the generated image signal, is based on representing 3D information by a texture map and associated depth map. The apparatus may specifically be part of a virtual reality server which may provide an image signal with 3D information for a scene. A (typically remote) virtual reality client may access the virtual reality server and in response be provided with the image signal from which it may locally generate suitable images of the scene to provide the virtual reality experience. Specifically, the virtual reality client device may typically be arranged to generate images for a given desired viewpoint based on the information received from the virtual reality server. Thus, the apparatus of FIG. 1 will henceforth be referred to as the encoder, and specifically as the encoder of a virtual reality server, but it will be appreciated that this is not intended to imply a limitation on the generality or the interpretation or understanding of the description of the apparatus.

The encoder comprises an encoder receiver 101 which is arranged to receive a number, and typically a plurality, of three dimensional images representing a scene from different viewpoints. Each of the 3D images comprises a mesh and at least a first texture map, i.e. three dimensional information is provided for each image using the well-known approach of linked meshes and texture maps.

In some embodiments, only a single 3D image may be provided but typically a plurality of different 3D images is provided with each of these representing a different viewpoint for the scene. For example, three to ten 3D images corresponding to a line of viewpoints may be received.

It will be appreciated that the encoder receiver 101 may receive the 3D images from any internal or external source. For example, in some embodiments, the virtual reality server may include a 3D model of the scene as well as a model evaluator that is arranged to generate 3D images in the form of meshes and texture maps by evaluating the model for the desired viewpoints. In other embodiments, the 3D images may be generated from captured images, such as e.g. from captured stereo images from cameras at different positions. For example, from a captured stereo image, a dense depth map may be estimated (e.g. based on disparity estimation) and from one of the stereo images and the depth map, a mesh and texture map may be calculated. Another example is the use of depth cameras which directly may provide an image and associated depth map (e.g. using built in ranging functionality). For such cases, a mesh may be generated from the depth map directly being provided by the depth camera.

Many 3D image (including video) processing algorithms and processes are based on the use of triangle meshes as this may provide high computational efficiency in many embodiments. Meshes providing three-dimensional information together with an associated texture map are widely used in many graphic processing systems, such as specifically in computer graphics. A mesh may provide information of the geometric structure which includes depth information (but is of course not limited to only provide depth information, e.g. it may typically provide a three-dimensional coordinate for each vertex). For brevity, the combination of a mesh and its associated texture map will also be referred to as a 3D image.

The approach is very suitable for flexibly modifying view directions when rendering the scene, and is particularly suitable for scenarios wherein the viewpoint is not restricted to movements in a strict horizontal line but rather a free movement of the viewpoint is desired. A known and efficient way to generate a new viewpoint is to transform the meshes originating from the different viewpoints to a single world coordinate system and then perform a perspective projection onto a new camera plane. These steps can be done very efficiently using standard optimized graphics hardware, such as hardware based on the OpenGL standard. However, in order to optimize quality and provide additional information e.g. for areas which are being de-occluded by the viewpoint transformations, the generation of a rendering image from a new viewpoint is preferably based on texture maps and meshes provided for a plurality of different viewpoints.

In order to provide the client side with sufficient information to generate high quality images for a range of viewpoints, it is desirable to include a large number of 3D images in the generated image signal. However, this requires a very large bandwidth and complicates distribution, communication, processing, and storage in the system. Therefore, a difficult trade off exists between the conflicting requirements for quality and efficiency.

The set of 3D images that can be used by the client side to perform e.g. view transformations may for brevity be referred to as anchor images, or sometimes just anchors. Thus, it is desirable for the image signal generated by the encoder to include as many anchor images as possible in the image signal in order to maximize quality but at the same time it is desirable to include as few anchor images as possible in order to minimize e.g. the data rate of the image signal. The encoder of FIG. 1 may be arranged to provide an improved trade-off between such conflicting requirements.

The encoder comprises a signal generator 103 which is arranged to generate the image signal. The signal generator 103 is coupled to the encoder receiver 101 from which it receives the 3D images, i.e. the texture maps and the corresponding meshes. The signal generator 103 is arranged to generate the image signal to include these 3D images, and specifically to include both the meshes and the texture maps for the images. The signal generator 103 accordingly generates the image signal to include anchor images in the form of the 3D images provided by the encoder receiver 101. These fully encoded anchor images are also referred to as reference images.

In addition, the encoder is arranged to generate the image signal to include additional anchor images. However, these images are not represented by a full texture map and full mesh but rather are represented by a residual data texture map where the residual data texture map provides data describing a texture map for an additional viewpoint with reference to a texture map of one of the 3D images included in the image signal, i.e. with reference to one of the reference images. Thus, the texture map at the additional position is provided as a relative texture map and accordingly is dependent on another texture map.

Specifically, the encoder receiver 101 may, in addition to the reference 3D images that are directly included in the image signal, also receive one or more texture maps which are encoded relative to a reference texture map. These texture maps may be received as individual texture maps but are typically received as texture maps of 3D images, i.e. together with a corresponding mesh. The set of 3D images that are directly included in the image signal are referred to as the reference 3D images, and similarly the corresponding viewpoints, texture maps, anchors, and meshes will be referred to as reference viewpoints, texture maps, anchors, and meshes. 3D images, texture maps, meshes, anchors, and viewpoints for which a relative encoding of the texture map is applied will be referred to as relative or predicted 3D images, texture maps, meshes, anchors, and viewpoints.

It will be appreciated that in many embodiments, the encoder receiver 101 will receive a set of 3D images represented by texture maps and associated meshes and these will be divided into a reference set of 3D images comprising the reference 3D images viewpoints (those that will be fully intra coded) and a relative set of 3D images comprising the relative 3D images/viewpoints (those that will be coded relative to other texture maps). In some embodiments, the division may be into more than two categories, e.g. the division may also be into other sets, such as a set of images that are simply discarded.

The encoder comprises a view shift processor 105 and a residual processor 107 which are arranged to generate residual data texture maps for the relative viewpoints.

Specifically, a texture map may be received for a viewpoint which is designated as a relative viewpoint. This texture map will be referred to as the first relative texture map.

The view shift processor 105 is fed a reference 3D image, i.e. a reference texture map and a reference mesh. In addition, it is fed information defining the corresponding reference viewpoint and the view point of the first relative texture map, referred to as the first relative viewpoint. The view shift processor 105 then proceeds to generate an intermediate texture map by performing a viewpoint transformation of the first reference texture map to the first relative viewpoint. The viewpoint transformation is based on the reference mesh and texture map.

It will be appreciated that any suitable approach for texture map viewpoint transformation or shifting may be used. As an example of an approach, a triangular mesh may be used to warp the texture. In this standard texture mapping approach, triangles are shifted and deformed and the texture is linearly (affine) deformed to form the new texture. The view shifting may for instance be performed by rendering the mesh into an off-screen OpenGL buffer.

The intermediate texture map is fed to the residual processor 107 which also receives the first relative texture map. The residual processor 107 proceeds to generate the residual data texture map based on a comparison of the intermediate texture map and the first relative texture map. In this way, the residual data texture map is generated to be indicative of a difference between the intermediate texture map and the first relative texture map.

In many embodiments, the residual data texture map may simply be determined as the pixel by pixel difference between the intermediate texture map and the first relative texture map. In some embodiments, the residue may possibly be lossy compressed using perceptual metrics such as contrast sensitivity and masking of spatial frequencies.

The shift processor 105 and the residual processor 107 is further arranged to repeat the process for an additional/second reference image corresponding to a different reference viewpoint. Thus, the apparatus of FIG. 1 is arranged to generate (at least) two residual data texture maps for the first relative viewpoint based on different reference images/viewpoints. Thus, the apparatus may generate a first residual data texture map for the first relative viewpoint based on a first reference image/reference texture map, and a second residual data texture map for the first relative viewpoint based on a second reference image/reference texture map. This may for spatial representations provide improved representation of the scene, for example addressing the issue of potential occlusions restricting the available data for the scene.

The residual processor 107 is coupled to the signal generator 103 which is fed the residual data texture maps. It then proceeds to include the residual data texture maps for the first relative viewpoint in the image signal. Thus, the image signal is generated to, in addition to a set of fully (intra)coded reference 3D images for a set of reference viewpoints, generate the image signal to include one or more residual data texture maps for at least one additional (relative) viewpoint. For at least one relative viewpoint, there are provided at least two residual data texture maps which provide residual data for the same texture map but from different reference images. The residual data texture maps will typically comprise much smaller values than the corresponding texture maps and accordingly can be encoded with much higher efficiency. Thus, in the approach a given set of received anchor images may be split into two sets with the first set comprising reference anchor images that are fully encoded and a second set comprising relative reference anchor images that are coded relative to the reference anchor images. The data rate required for the second set is substantially lower than for the first set, yet allows a decoder to recreate the corresponding anchor image.

Accordingly, a larger number of accurately represented anchor images can be communicated for a given data rate (or a lower data rate can be achieved for a given number of anchor images to be communicated). Further, improved information that is particularly suitable for characterizing/representing a three dimensional scene can be achieved by including multiple residual data texture maps for the same relative viewpoint.

The exact decision of which received anchor images to fully encode, and which to apply relative or predictive encoding to, may be different in different embodiments and scenarios. For example, in some embodiments, the 3D images corresponding to a line of viewpoints may be alternated between the two sets. In other embodiments, the decision may e.g. be based on the distance between viewpoints. E.g. if the distance from a given viewpoint to the nearest fully encoded reference viewpoint exceeds a given value then the viewpoint is designated as a reference viewpoint and otherwise it is designated as a relative viewpoint.

In many embodiments, the mesh for the residual data texture map, i.e. for the relative anchor, may also be fed to the signal generator 103 and may be included in the image signal. Indeed, in many embodiments, this mesh, referred to as the first relative mesh, may be fully encoded and included in the image signal. As the data required to represent a mesh is often an order of magnitude or so less than the amount of data required to represent a texture map, this may still result in a substantial reduction in the required amount of data. Similarly to the approach for the relative texture maps, the signal generator may also include a second mesh which is associated with the second residual data texture maps.

In some embodiments, no mesh data for the first relative viewpoint/3D image may be included in the image signal. In such cases, mesh data for the first relative viewpoint may e.g. be generated by a decoder based on received reference meshes.

In some embodiments, (only) relative mesh data is provided for the first relative viewpoint. This may in many scenarios provide an improved trade-off between data rate and quality/accuracy.

Thus, in many embodiments, the encoder may generate an image signal comprising a number of three dimensional images representing a scene from different viewpoints, each three dimensional image comprising a mesh and a texture map, the signal further comprising residual data texture maps for a first viewpoint being different from the different viewpoints of the number of three dimensional images, the residual data texture maps providing residual data for a texture map for the first viewpoint relative to a texture map resulting from a viewpoint shift of a reference texture map being a texture map of a first, and respectively second, three dimensional image of the number of three dimensional images.

Figure 2:
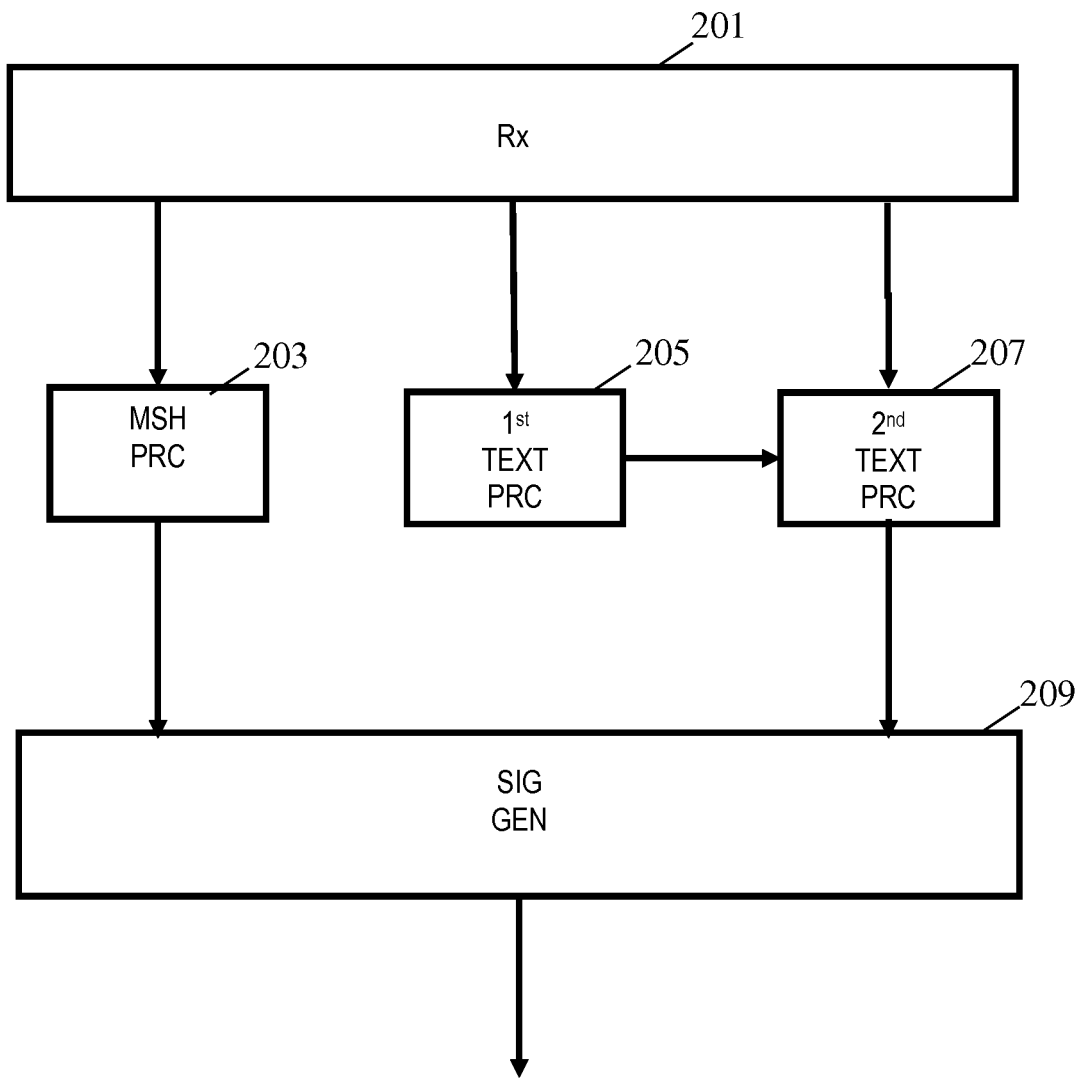
FIG. 2 illustrates an example of elements of an apparatus for generating an image in accordance with some embodiments of the invention.

FIG. 2 illustrates an example of an apparatus for generating an image from such an image signal. The apparatus is specifically capable of generating the image to correspond to a viewpoint which is not represented by the received signal, i.e. it is not one of the anchor viewpoints/images of the image signal (whether a reference or relative viewpoint). The apparatus may specifically be part of a virtual reality client device that is arranged to continuously generate images corresponding to viewpoints of a character moving in the scene. The apparatus will for brevity be referred to as a decoder without any loss of generality being intended by the use of this term.

The decoder comprises a receiver 201 which receives the image signal from the decoder/virtual reality server. The processing is first described for a scenario where a single residual data texture map is provided for a given first (relative) viewpoint.

The decoder may be arranged to generate an image for a desired viewpoint based on the received anchor images. In some situations, specifically for some viewpoints, the generation of the image may be based on a two stage approach wherein an intermediate 3D image is first generated for a relative viewpoint based on the residual data texture map for that relative viewpoint and at least one reference 3D image. Subsequently, the image for the desired viewpoint is then generated from this intermediate 3D image. The approach will be described in more detail in the following wherein the relative viewpoint corresponding to the relative anchor image is referred to as the first viewpoint.

The decoder comprises a mesh processor 203 which is arranged to generate a first mesh for the first viewpoint. In some embodiments, the received image signal may comprise a mesh for the first viewpoint and this may be used directly.

In many embodiments, the mesh processor 203 is arranged to generate the first mesh for the first viewpoint from a reference mesh which is a mesh of the appropriate 3D image. In some embodiments, the reference mesh may directly be used as the first mesh but in most typical embodiments the first mesh may be generated by a warping or viewpoint shifting/transforming the reference mesh from the reference viewpoint to the first viewpoint.

It will be appreciated that any suitable approach for warping/transforming the reference mesh into the first mesh, i.e. to generate a mesh for the first viewpoint from the mesh of the reference viewpoint may be used. For example, a straightforward approach is to use the 3D coordinates as they are output of the vertex processor after it has been used to warp the texture. For example, each 2D vertex of the mesh together with its disparity value can be projected into a 3D space. Then this 3D point can be re-projected onto the image plane of the virtual viewpoint. By applying this operation to all vertices, a mesh is transformed. (The (re)projection operations can be condensed into highly efficient small matrix operations. GPU's are specifically designed to perform such operations efficiently as they occur a lot with graphics processing).

The decoder further comprises a first texture processor 205 for generating an intermediate texture map in response to a viewpoint transformation of the reference texture map from the reference viewpoint to the first viewpoint. It will be appreciated that any suitable approach for warping/transforming the reference texture map from the reference viewpoint to the first viewpoint may be used. For example, texture mapping using the given mesh may be performed. The view shifting may for instance be performed by rendering the mesh into an off-screen OpenGL buffer.

The intermediate texture map thus corresponds to a predicted or estimated texture map at the first viewpoint based on the reference anchor image. The intermediate texture map may specifically be generated using the same algorithm as used by the view shift processor 105 of the encoder. Thus, the intermediate texture map may correspond directly to the intermediate texture map generated by the view shift processor 105 of the encoder. Accordingly, the residual data texture map generated by the encoder and received by the decoder may provide an accurate indication of the differences between the intermediate texture map generated by the first texture processor 205 and the original texture map received at the encoder.

The decoder further comprises a second texture processor 207 which is fed the intermediate texture map and which is arranged to generate the first texture map by combining the intermediate texture map and the residual data texture map. Specifically, in many embodiments, the first texture map may be generated by adding the intermediate texture map and the received residual data texture map.

The second texture processor 207 may accordingly generate a first texture map which corresponds very closely (and often is substantially identical to) the relative texture map provided to the encoder for the first viewpoint. Thus, an accurate anchor texture map is generated for the first position. Similarly, the mesh processor 203 may generate an accurate mesh for the first viewpoint (or indeed directly retrieve this from the received image signal).

The decoder further comprises an image generator 209 which is fed the first texture map and the first mesh, i.e. it is fed the generated 3D image for the first viewpoint. As this 3D image is based on the residual data texture map, it provides a very accurate reflection of the original 3D image that the encoder received for the first viewpoint and accordingly this first 3D image may be used as an anchor image provided for the first viewpoint.

The image generator 209 is accordingly arranged to generate an output image for the desired viewpoint, the second viewpoint, from the first 3D image, i.e. from the first texture map and the first mesh. Specifically, the image generator 209 may be arranged to apply a view transformation/shifting process to the first 3D image to generate an output image corresponding to the second viewpoint, i.e. a viewpoint shift from the first to the second image is generated.

The approach may allow a substantially improved quality of the view in scenarios where the second viewpoint is close to the first viewpoint but at further distance to the reference viewpoints. However, this is achieved without the corresponding penalty in terms of data rate, complexity etc. required by providing a full set of reference images. Thus, a much improved data rate vs quality trade-off can be achieved.

For the scenario in which there are two residual data texture maps provided for the first relative viewpoint, the system may first perform the described operations to generate a first mesh and first intermediate texture map based on the first residual data texture map (and the first reference image). It may then proceed to perform the same operations to generate a second intermediate mesh and second intermediate texture map based on the second residual data texture map (and the second reference image). Thus, two intermediate texture maps, and typically two meshes, are generated for the same relative anchor viewpoint, i.e. for the first viewpoint (in some scenarios and embodiments the two meshes for the first viewpoint may be the same, i.e. the first and second texture maps may both relate to the same mesh).

The image generator 209 may proceed to generate the output image based on both intermediate texture maps, and typically also both intermediate meshes. As will be described in more detail later, the intermediate texture maps and meshes may e.g. be combined to generate a single combined intermediate texture map and a single mesh, and the image generator may render an image for the second viewpoint based on this. In other embodiments, a first image for the second viewpoint may be generated from the first intermediate texture map and mesh, and a second image for the second viewpoint may be generated from the second intermediate texture map and mesh. These two images may then be combined/merged (e.g. using a weighting that reflects the relative occlusions for the intermediate texture maps).

A particularly advantageous approach may be where the mesh for the first viewpoint, and indeed often for all relative viewpoints, is not fully represented in the image signal, i.e. in embodiments where the image signal may comprise only partial or no data for the first mesh.

In such an approach, the encoder may split a set of anchor images into reference anchor images and relative anchor images. Relative anchor images can then be predicted from reference anchor images and their associated meshes and the difference between the original anchor image and the predicted anchor image can be coded differentially.

However, such an approach poses a new problem since the relative anchor image(s) is used to generate new images for different viewpoints but no mesh is available for the relative viewpoint. In many embodiments, this may be addressed by reusing/recycling a mesh from the reference anchors by geometrically modifying such a mesh so that it is suitable for view synthesis from a relative anchor.

In the following, the approach will be illustrated by considering a more detailed example.

Figure 3:
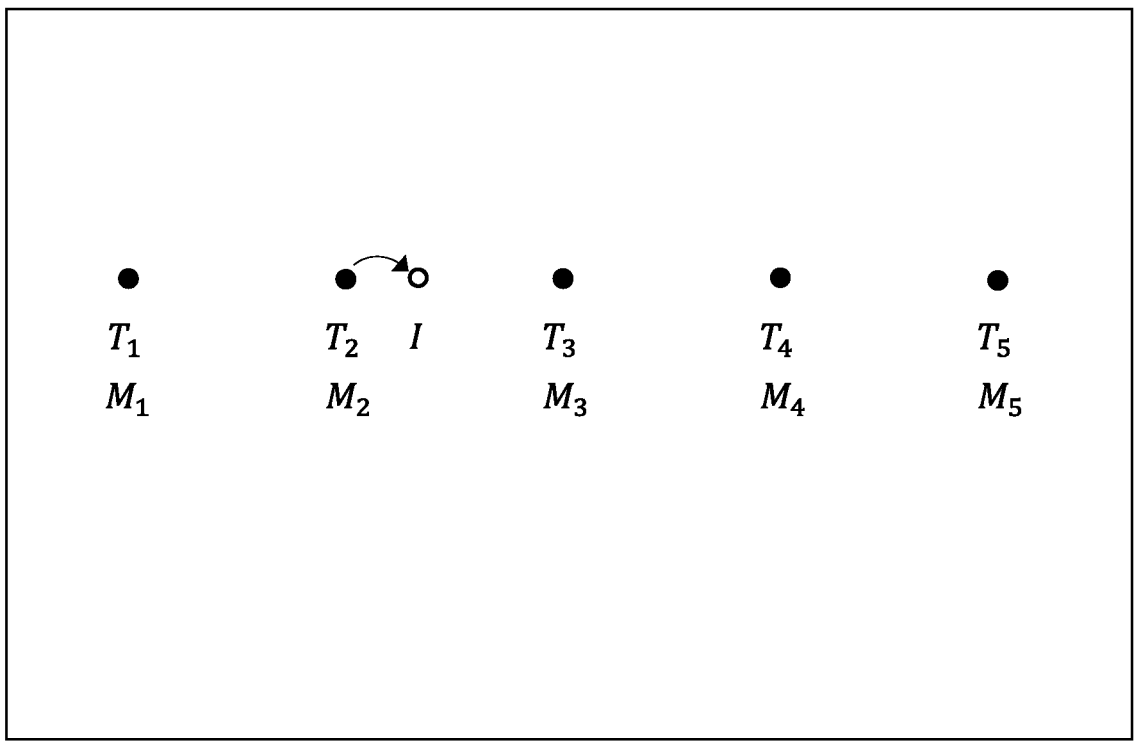
FIG. 3 illustrates an example of viewpoints for an image signal.

FIG. 3 may illustrate an example of the approach for mesh based rendering (generation of suitable images). In the example, each filled circle represents a spatial anchor viewpoint/location. The open circle represents the location of the view to synthesize, i.e. it represents the second viewpoint (e.g. corresponding to either the left eye location or the right eye location for a viewer). Each anchor k consists of a texture $T_k$ and a depth/3D mesh $M_k$. Storing, distributing, and/or processing all k anchors is very expensive in terms of bandwidth, computational complexity etc. View-synthesis wherein an image is generated for a given desired viewpoint may typically be desired to be based on the texture from the spatially closest anchor ($T_2$) being warped to the desired viewpoint using the associated mesh ($M_2$).

Figure 4:
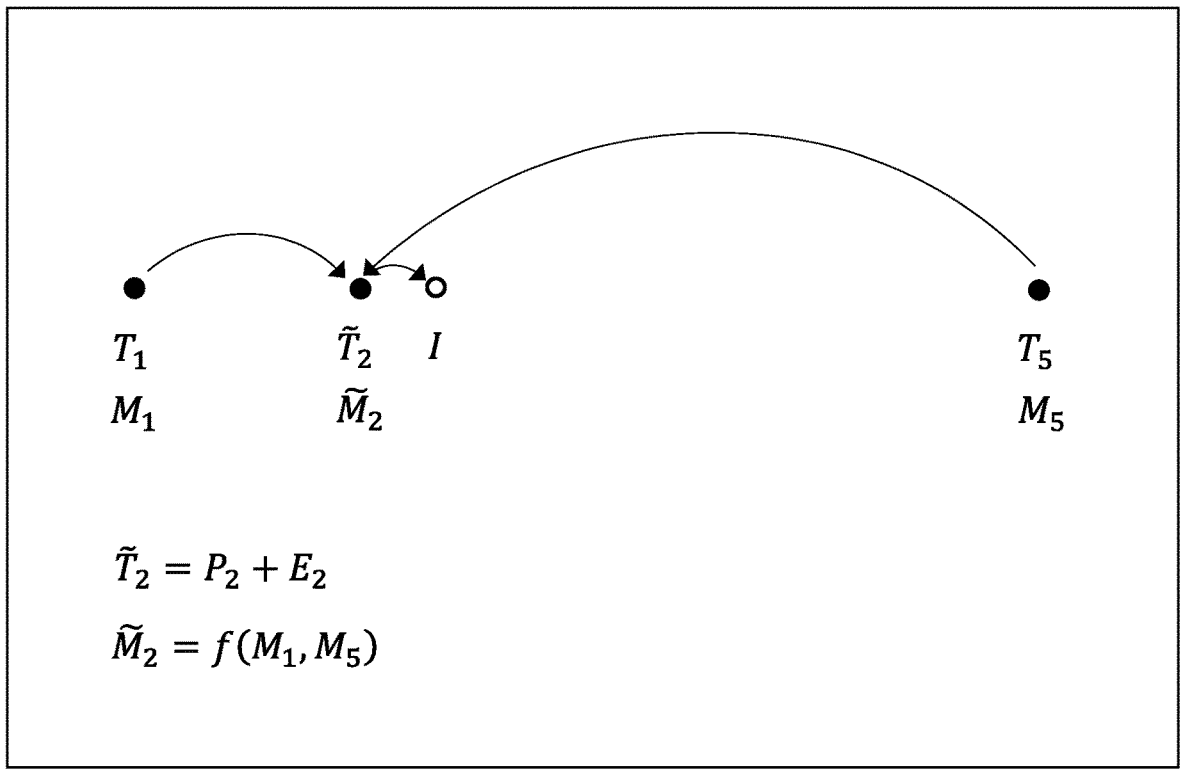
FIG. 4 illustrates an example of viewpoints for an image signal.

FIG. 4 illustrates an example reflecting a specific use of the described approach where data for some of the anchors are now predicted from nearby anchors. The texture maps for these predicted/relative anchor images are differentially encoded by storing only the difference image (for instance as a JPG file). The mesh for the relative anchor may be provided directly, but in many embodiments, it may also be generated from the fully intracoded reference images.

In the example of FIG. 4, only anchors 1 and 5 are intra coded, i.e. are reference anchors. Anchor 2 is in the example predicted from (both) anchors 1 and/or 5. The tilde (˜) above the texture and mesh variables for anchor 2 denote that these are reconstructed. Texture $T_2$ is reconstructed using differential coding, i.e. based on the residual data texture map. The mesh $M_2$ is e.g. generated from the reference mesh(es). E.g. the mesh from the closest anchor ($M_1$) is recycled/reused after a geometric transformation.

Once the relative anchor has been generated, the image I for the desired viewpoint can be calculated using a viewpoint shift algorithm based on the texture $T_2$ and the mesh $M_2$.

In many embodiments, the closest anchor may be used to generate the first mesh and the first texture map. In FIG. 4, the reference anchor that lies closest to predicted/relative anchor 2 is anchor 1. The mesh of anchor 1 is thus used twice: it is first used to synthesize the texture map for relative anchor 2, after which it is 'recycled', which means that it is geometrically modified, and then used to synthesize the final image I. Prediction of texture map $P_2$ from texture map $T_1$ is performed both at the encoder (to extract the differential image to compress) and at the decoder to reconstruct anchor texture $T_2$.

The operation may be performed by the mesh coordinates first being rotated and translated into the camera coordinate system and then projected using perspective projection. This standard operation is typically represented in homogeneous coordinates using a 4×4 matrix called the model view projection matrix:

$$\begin{bmatrix} wu' \\ wv' \\ w \\ 1 \end{bmatrix} = PV_2M \begin{bmatrix} x \\ y \\ z \\ 1 \end{bmatrix} \quad (1)$$

where (u', v') are the resulting image coordinates for projection of point (x, y, z) and $V_2$ is the camera view matrix for anchor 2. In equation (1) M represents a transformation that converts the input coordinates into generic world coordinates (it denotes a model matrix for transforming from local to global object coordinates), $V_2$ converts the world coordinates into camera coordinates for the viewpoint of anchor 2, and P performs a projection transformation.

The operation in equation (1) is typically performed in a so called vertex shader program running on a GPU.

The input to equation (1) is a mesh which contains the set of 3D points of the vertices of the mesh as well as the corresponding texture coordinates (u, v) and a vector of indices describing how points form triangles. The geometric operation that the vertex shader performs as given in equation (1) is just one of many operations that the graphics hardware performs when warping texture $T_1$ to anchor 2 using mesh $M_1$. For simplicity, we write this standard texture mapping/viewpoint shifting/transform operation as:

$$P_2 = \text{texturemap}[T_1, M_1] \quad (2)$$

The texture mapping is a standard operation available on most devices that have a graphics function. APIs such as OpenGL, Vulkan and DirectX support it.

After the texture mapping operation, we can reconstruct the original texture $T_2$ from the generated intermediate texture map $P_2$ using the residual data texture map $E_2$:

$$\tilde{T}_2 = P_2 + E_2 \quad (3)$$

The operations in equation (3) may advantageously be performed on a GPU using a so called fragment shader program. This has the advantage that the resulting texture $\tilde{T}_2$ is kept in GPU memory where it is required when performing the second (final) render step to produce final eye-image I.

In order to generate an image for a different viewpoint (the second viewpoint), an additional view-synthesis pass is performed to generate the output image I. For this step, we recycle the mesh that was used in the first synthesis step.

For this second view-synthesis step a vertex shader program may be used that performs the following geometric transformation on the 3D mesh coordinates:

$$\begin{bmatrix} wu'' \\ wv'' \\ w \\ 1 \end{bmatrix} = PV_{final}M \begin{bmatrix} x \\ y \\ z \\ 1 \end{bmatrix}. \quad (4)$$

Note that the same points coordinates: (x, y, z) enter the vertex shader as in equation (1) which was for the prediction of texture map $P_2$. The overhead of performing the operation of equation (4) is therefore limited since the mesh points are already present in GPU memory due to a previous view synthesis step on the same coordinates. Camera view matrix $V_2$ for anchor 2 has now been replaced by view matrix $V_{final}$ that corresponds to the camera view of the output image, i.e. it corresponds to the second viewpoint. Texture coordinates (u', v') related to texture $\tilde{T}_2$ are now needed in the texture mapping operation.

The second texture mapping operation produces the final output image:

$$I = \text{texturemap}[\tilde{T}_2, M_2]. \quad (5)$$

Figure 5:
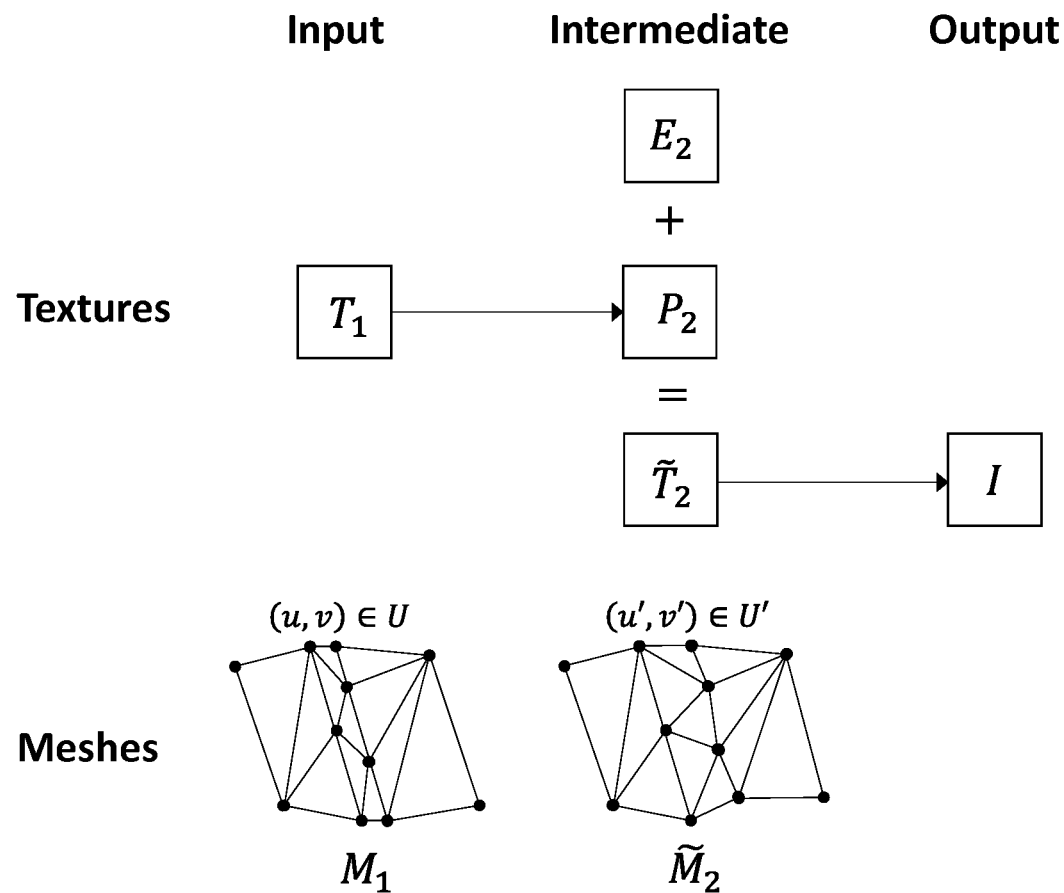
FIG. 5 illustrates an example of a generation of an image based on mesh and texture map data.

The process is further exemplified by FIG. 5. In the example, texture $T_1$ is warped to predict texture $T_2$ using mesh $M_1$. At the same time, $M_1$ itself is deformed to produce $\tilde{M}_2$. Residual image $E_2$ is used to calculate the reconstructed texture $\hat{T}_2$. The output image is synthesized by warping the reconstruction $\hat{T}_2$ using the recycled (deformed) mesh $\tilde{M}_2$.

As mentioned, different approaches may be used for communicating mesh information for the relative anchors. In some embodiments, no dedicated mesh data for a relative anchor is included in the image signal, and the image signal thus contains no mesh information that relates specifically (and only) to the relative anchor(s). However, as the mesh for the relative anchor 3D image is used to perform the image synthesis for the desired viewpoint, the mesh must be generated from the received image signal data.

In such cases, the mesh processor 203 is arranged to generate the mesh for a relative anchor from mesh data from a reference anchor. Thus, in the specific example described above, the mesh processor 203 may be arranged to generate the first relative mesh from the reference mesh, i.e. the mesh for the first (relative) viewpoint is generated from the mesh of the reference viewpoint.

In some embodiments, the mesh processor 203 may be arranged to generate the first relative mesh simply by copying the reference mesh. This may allow sufficiently accurate depth information in many scenarios where in particular the relative and reference viewpoints are very close to each other.

However, in other embodiments, the mesh processor 203 may be arranged to generate the first relative mesh by applying a viewpoint transformation or warping to the reference mesh to warp this from the reference viewpoint position to the relative viewpoint position.

It will be appreciated that various techniques for such warping are known to the skilled person and that any suitable approach may be used.

In many embodiments, the image signal may comprise dedicated mesh data for a relative anchor image. Thus, the image signal may comprise mesh data specifically for the first viewpoint. Indeed, in some embodiments, the image signal may comprise a full encoding of the relative mesh at the first viewpoint and the mesh processor 203 may simply generate the first relative mesh as the decoded received relative mesh. As the mesh typically requires much less data than a texture map, this approach will still provide a substantial data rate reduction.

In many embodiments, the image signal may comprise mesh residual data for mesh for the first viewpoint, i.e. it may comprise residual mesh data for the first viewpoint. The residual data may be relative to the mesh for the same reference viewpoint as the residual data texture map for the first viewpoint.

In some embodiments, the residual mesh data may be provided relative to the reference mesh as this is received in the image signal. However, in many embodiments, the residual mesh data is relative to a mesh that results from a viewpoint transformation/warping from the reference position to the relative viewpoint.

Thus, in such embodiments, the mesh processor 203 may be arranged to generate an intermediate mesh by applying a viewpoint transformation to the received reference mesh. Thus, the intermediate mesh is generated from a warping of the reference mesh from the reference viewpoint to the first viewpoint. The viewpoint transformation may correspond to one that is used by the encoder to generate an intermediate mesh from which the residual mesh data is generated. The residual mesh data may be accordingly be used to modify the intermediate mesh to generate the first relative mesh.

In some embodiments, the residual mesh data may for example be information indicating a modification or change of typically a subset of the vertices in the mesh. For example, an offset or shift vector may be provided for vertices which by the encoder are detected to be important and/or for which the difference between the position in the generated intermediate mesh and the anchor (relative) mesh is too large. The received shift vectors may accordingly be applied to the mesh to shift these to the correct position.

Thus, in many embodiments, the residual mesh data may only comprise residual data for a subset of the vertices of the mesh (as the warping typically retains the vertices of the reference mesh, the image signal may link e.g. offset vertex vectors to vertices of either mesh). The vertices may specifically be selected in the encoder based on the comparison between the intermediate mesh and the relative mesh. Such an approach may reduce the data rate further while typically having a negligible effect on the resulting quality.

Figure 6:
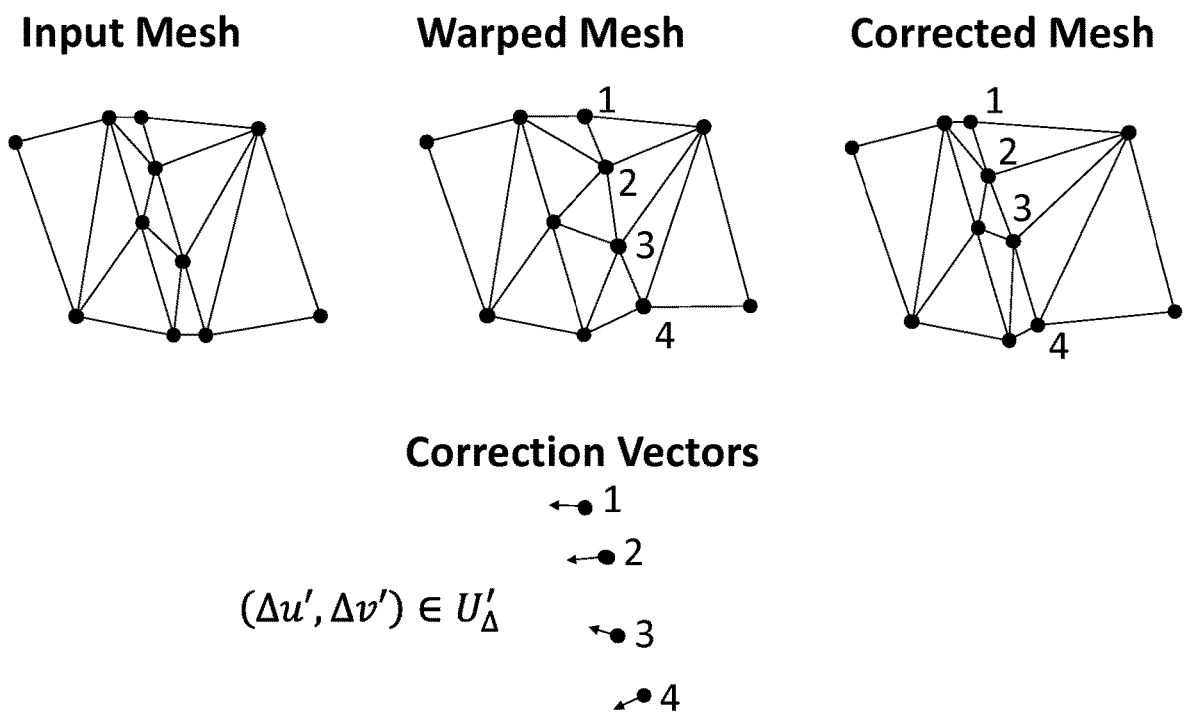
FIG. 6 illustrates an example of a generation of mesh.

An example of such an approach is illustrated in FIG. 6. In this example, a small amount of data is communicated for each mesh of a predicted/relative anchor such that the original mesh (which is not transmitted) can be reconstructed from the mesh that is warped from the nearby reference anchor. Typically, these correction vectors will only be needed in occlusion/de-occlusion regions and therefore the number of correction vectors will tend to be small.

It will be appreciated that the mesh residual data may be provided as a reference to the coordinates in the mesh itself (x, y, z) coordinates or with reference to the corresponding coordinates in the texture map (u,v), i.e. the mesh data is considered to include both sets of coordinates (indeed the vertices are represented by data vectors including both the corresponding x, y, z and u,v coordinates).

The previous description has focused on scenarios wherein the image for the second viewpoint (the desired viewpoint) is generated from a relative anchor, with this relative anchor being generated based on one reference anchor (and with residual data being relative to this reference anchor). However, in some embodiments, the output image may be generated based on a plurality of reference anchor images via one or more relative anchor images being used as part of the process.

It should also be noted that in special cases, such as when the desired viewpoint is closest to a reference anchor, the apparatus of FIG. 1 may generate the image without relying on any relative anchor, e.g. it may only use the nearest reference anchor.

In some embodiments, the described approach may be used to generate multiple images for the second viewpoint and the output image may be generated from these images. For example, the output image may be generated by a weighted combination of the generated images. e.g. with the weights being dependent on occlusion information for the individual images.

In some embodiments, the image generator 209 may accordingly be arranged to generate a first intermediate image for the second viewpoint in response to the first texture map and the first mesh, i.e. in response to the first relative anchor/3D image. It may further generate a second intermediate image for the second viewpoint in response to an additional texture map and an additional mesh for an additional viewpoint, i.e. a second intermediate image is generated based on a different anchor image. The approach for generating the second intermediate image may be the same as for generating the first intermediate image but based on a different anchor image.

This different anchor image may for example be a reference anchor image. Thus, in some embodiments, the additional texture map and the additional mesh may be a texture map and a mesh of a reference 3D image.

In other embodiments or scenarios, the different anchor image may be a relative anchor image. Thus, in some embodiments, the additional intermediate image may be generated by using the exact same approach as for the first intermediate image but using a different relative anchor generated using a different residual data texture map and often a different reference image.

Thus, in some embodiments, the first texture processor 205 is arranged to generate an additional intermediate texture map in response to a viewpoint transformation of an additional reference texture map from a viewpoint of the additional reference texture map to an additional viewpoint where the additional reference texture map is a texture map of a second reference 3D image. The second texture processor 207 may in such embodiments be arranged to generate the additional texture map in response to a combination of the additional intermediate texture map and an additional residual data texture map for the additional viewpoint.

Similarly, the mesh processor 203 may be arranged to generate the additional mesh in response to a viewpoint transformation of a mesh of the second reference 3D image from a viewpoint of the additional reference texture map to the additional viewpoint.

The image generator 209 may then generate the second intermediate image from the resulting additional texture map and the additional mesh.

In the approaches of FIGS. 1 and 2, a plurality of reference images are used to generate anchor image information for the first relative viewpoint.

In the approach, the image signal comprises a plurality of residual data texture maps for the first viewpoint. Each of the residual data texture maps provide residual data for the texture map of the first viewpoint with respect to different reference viewpoints, i.e. with reference to different reference texture maps. In this approach, a plurality of alternative relative texture maps and meshes may be generated for the first viewpoint using different reference images and residual data texture maps.

In such embodiments, the mesh processor 203 may be arranged to generate a plurality of meshes for the first relative viewpoint. For example, in addition to the generation of a mesh from the first reference viewpoint as described above, it may also generate an additional/second mesh for the first viewpoint from an additional reference viewpoint. For example, in FIG. 3, a mesh is generated from $M_1$ and an additional mesh is generated from $M_5$.

Specifically, the mesh processor 203 may generate a relative mesh for each reference viewpoint used in generating the output image. Each of these relative meshes may be determined as previously described, i.e. typically warping followed by optional correction based on mesh residual data may be performed for each reference viewpoint considered.

Similarly, the first texture processor 205 and the second texture processor 207 may be arranged to generate a plurality of texture maps for the first relative viewpoint. For example, in addition to the generation of a first texture map from the first reference viewpoint as described above, it may also generate an additional/second texture map for the first viewpoint from an additional reference viewpoint. For example, in FIG. 3, a texture map is generated from $T_1$ and an additional texture map is generated from $T_5$. Each of these texture maps is generated by a view shift followed by combination with appropriate residual data texture map from the relevant reference viewpoint.

Specifically, the first texture processor 205 and the second texture processor 207 may generate a relative texture map for each reference viewpoint used in generating the output image.

Each of these relative texture maps may be determined as previously described, i.e. typically warping followed by correction based on residual data texture map may be performed for each reference viewpoint considered. Thus, specifically, the first texture processor 205 may generate an intermediate texture map for each considered reference viewpoint by performing a viewpoint transformation of the texture map of the individual reference viewpoint from the position of the individual reference viewpoint to the first viewpoint position. The second texture processor 207 may then for each of the generated intermediate texture maps generate a texture map for the first viewpoint by combining the intermediate texture map with the appropriate residual data texture map.

The image generator 209 may then be arranged to generate the output image in response to the plurality of relative 3D images for the first viewpoint, i.e. in response to the texture maps and meshes for the first viewpoint generated from the different reference anchors.

This may be done in different ways in different embodiments. In some embodiments, a merging or combination of the different relative 3D images may be performed for the first viewpoint i.e. on the relative 3D images, before the viewpoint transformation to the second viewpoint, i.e. before the image synthesis for the output image. In other embodiments, viewpoint transformation is individually applied to the plurality of relative 3D images for the first viewpoint and the resulting images for the second viewpoint are then merged (for example averaged). Note that in case the different reference anchors corresponded to images with a different dynamic range, a specific high-dynamic range processing step may be used during the merge process.

Specifically, in some embodiments, the image generator 209 may be arranged to generate a first intermediate image for the second viewpoint in response to a viewpoint transformation from the first viewpoint to the second viewpoint based on a first texture map and a first mesh generated for the first viewpoint from a first reference 3D image. Similarly, the image generator 209 may be arranged to generate a second intermediate image for the second viewpoint in response to a viewpoint transformation from the first viewpoint to the second viewpoint based on a second texture map and a second mesh generated for the first viewpoint from a second reference 3D image. Thus, in this case alternative intermediate output images are generated. These output images are then combined/merged by the image generator 209 to generate the final output image for the second viewpoint.

This approach may accordingly correspond to the approach where multiple different anchors are used to generate intermediate images for the second viewpoint but with the specific requirement that some of these anchor 3D images are for the same viewpoint.

It will be appreciated that different approaches to the combination of the alternative intermediate output images may be applied. In many embodiments, the combination may be in response to occlusion data representing occlusion information for the reference viewpoints. For example, as part of the view transformation, areas that become de-occluded may be identified. These areas will typically be different areas for different viewpoints. Accordingly, the image generator 209 may when combining the intermediate images do so by performing a weighted combination wherein the weights are set to reflect whether the corresponding pixel is a pixel that has been de-occluded or not. In this way, the weights for pixels that do not result from de-occlusion processing are weighted higher than pixels that do result from de-occlusion processing. As a simple example, the weight for a de-occluded pixel may be set to zero if a corresponding pixel in another intermediate image is not a de-occluded pixel.

In some embodiments, the image generator 209 may be arranged to combine the intermediate images dependent on a direction of viewpoint shifts from the corresponding reference viewpoints to the first viewpoint relative to the direction of viewpoint shift from the first viewpoint to the second viewpoint. Specifically, weights for pixels of intermediate images that result from the two viewpoint shifts that are in the same direction may be weighted higher than pixels of intermediate images that result from the two viewpoint shifts that are in different, or even opposite, directions.

This may tend to provide improved results and in particular may reflect that this is less likely to result in de-occlusion errors, i.e. shifts in the same direction will tend to result in less overall de-occluded areas than shifts in opposite directions.

A particular advantage of the approach of combining at the second viewpoint phase is that it may avoid any determination of a new combined mesh for the first viewpoint. Rather, the received or easily derived meshes from the reference meshes may be used directly in the viewpoint transformation. Although multiple viewpoint transformations may be needed, these are often standardized and highly (hardware) optimized processes and therefore tend to be less computationally problematic than the operation of merging/combining different meshes.

In some embodiments, the decoder may as mentioned be arranged to combine the multiple relative 3D images for the first viewpoint before any view transformation to the second viewpoint is performed. For example, the image generator 209 may combine a first texture map derived from a first reference anchor and a second texture map derived from a second reference anchor into a third texture map for the first viewpoint. The combination may for example be a weighted combination with the weights being set depending on whether the individual pixels result from de-occlusion processing or not.

Further, the image generator 209 may combine a first mesh derived from the first reference anchor and a second mesh derived from the second reference anchor into a third mesh for the first viewpoint Different approaches may be used for combining the meshes but typically such operations tend to be more complex than combining texture maps. One option is to detect which triangles from a first mesh are mapped in the de-occlusion region of a second mesh and vice versa. These triangles may then replace the triangles of the de-occlusion region. Thus, one of the meshes may be used as a reference with areas resulting from de-occlusion being replaced by the corresponding areas from the other mesh.

In some embodiments, the residual mesh data may include information on how meshes are to be merged/combined. For instance, points could be moved, merged, deleted, new triangles could be formed, etc.

In this way, the image generator 209 may accordingly generate a relative anchor 3D image which may then be used for a viewpoint transformation to the second viewpoint. Thus, the image generator 209 may be arranged to generate the output image in response to a viewpoint transformation from the first viewpoint to the second viewpoint based on the third texture mesh and the third mesh.

In the following a more detailed description will be provided of an example where multiple reference anchors is used where the merging is performed using second viewpoint data. In the approach, blending of meshes is avoided by postponing the texture blending to the final rendering, i.e. to the second viewpoint phase:

1. Multiple reference anchors having textures $T_i$, and meshes $M_i$ are individually warped onto a predicted anchor j corresponding to the first viewpoint, resulting in textures $P_{i,j}$ and meshes $M_{i,j}$.
2. Any residual data texture maps $E_{i,j}$ refine the textures resulting in $T_{i,j}=P_{i,j}+E_{i,j}$.
3. A final warp may produce the intermediate output images for the second viewpoint which specifically may be a left eye image $T_{i,j,L}$ or a right eye image $T_{i,j,R}$. In addition, it may produce auxiliary information such as confidence, disparity, depth or maps that quantify the amount of stretching etc.
4. The intermediate images may then be merged to arrive at the final output image, which again may be a left eye image $T_L$ or a right eye image $T_R$.

Figure 7:
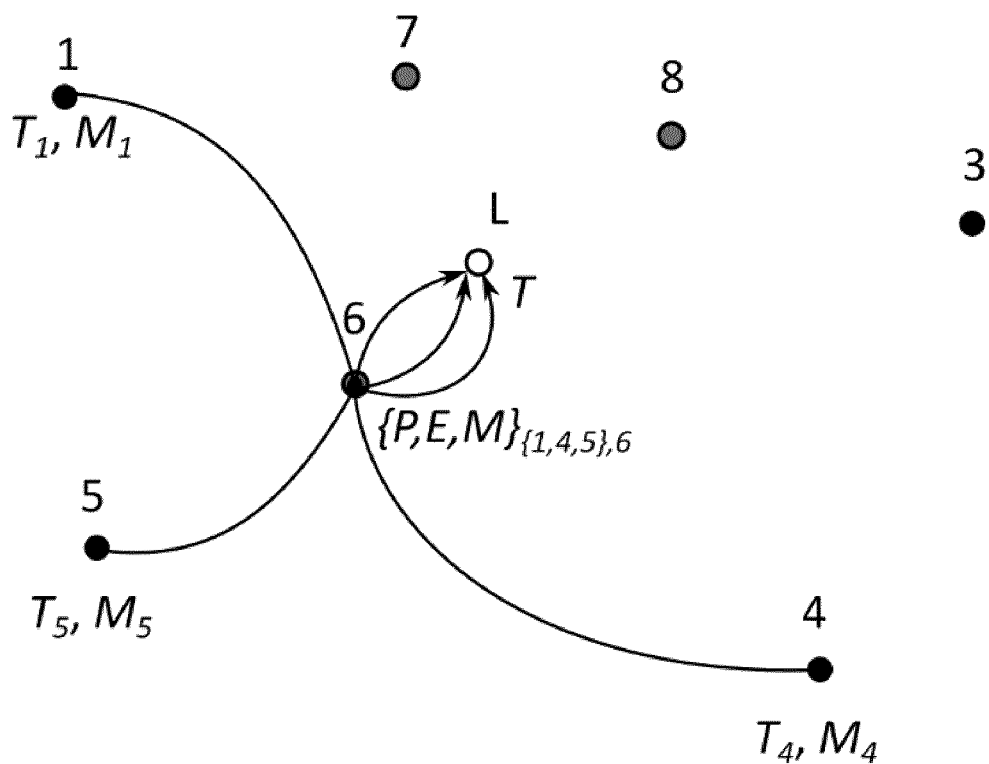
FIG. 7 illustrates an example of a generation of an image based on mesh and texture map data.

In some embodiments, the output image may be based on multiple reference anchors but with a plurality of these all using the same relative viewpoint. Thus, in this example, each predicted anchor is based on multiple reference anchors so a set of textures and meshes is associated with the predicted anchor. The relation between predicted and reference anchors may be determined by a regular pattern and/or a reference anchor encodes identifiers of the reference anchors. This example is illustrated in FIG. 7.

Figure 8:
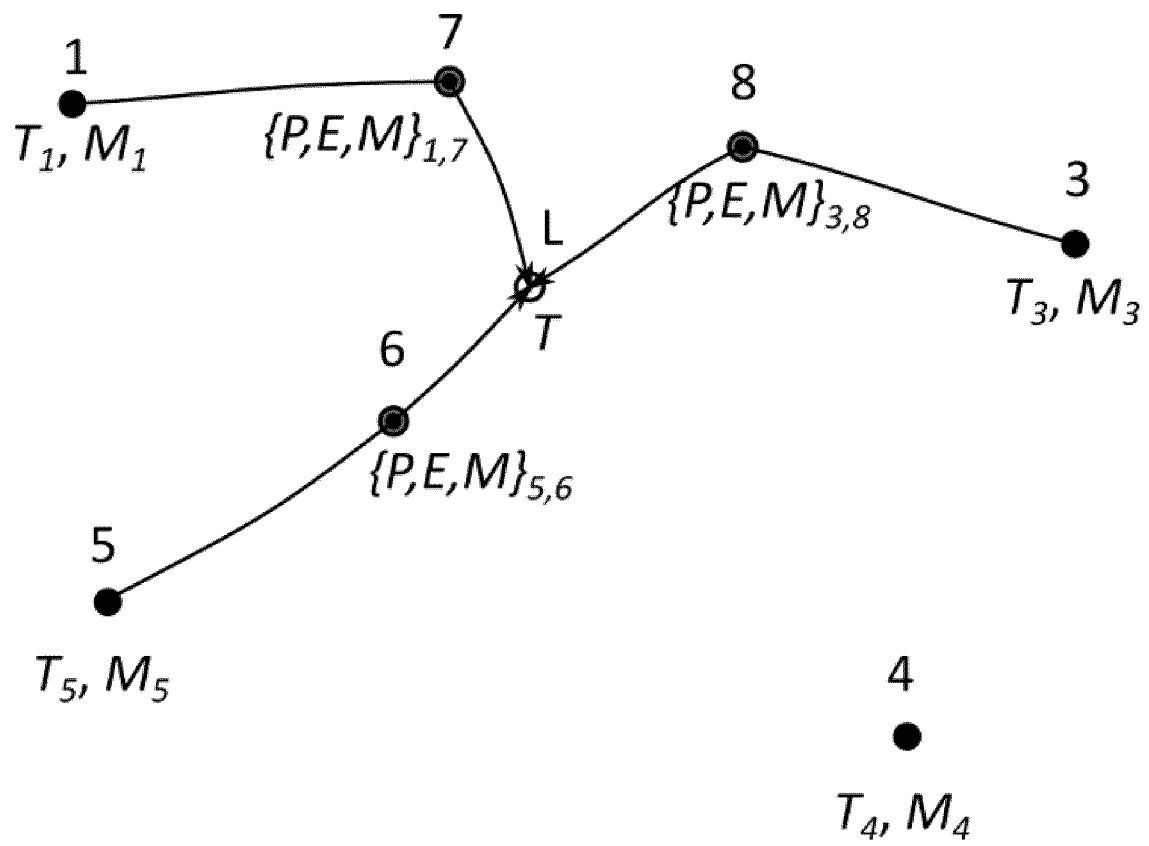
FIG. 8 illustrates an example of a generation of an image based on mesh and texture map data.
Figure 9:
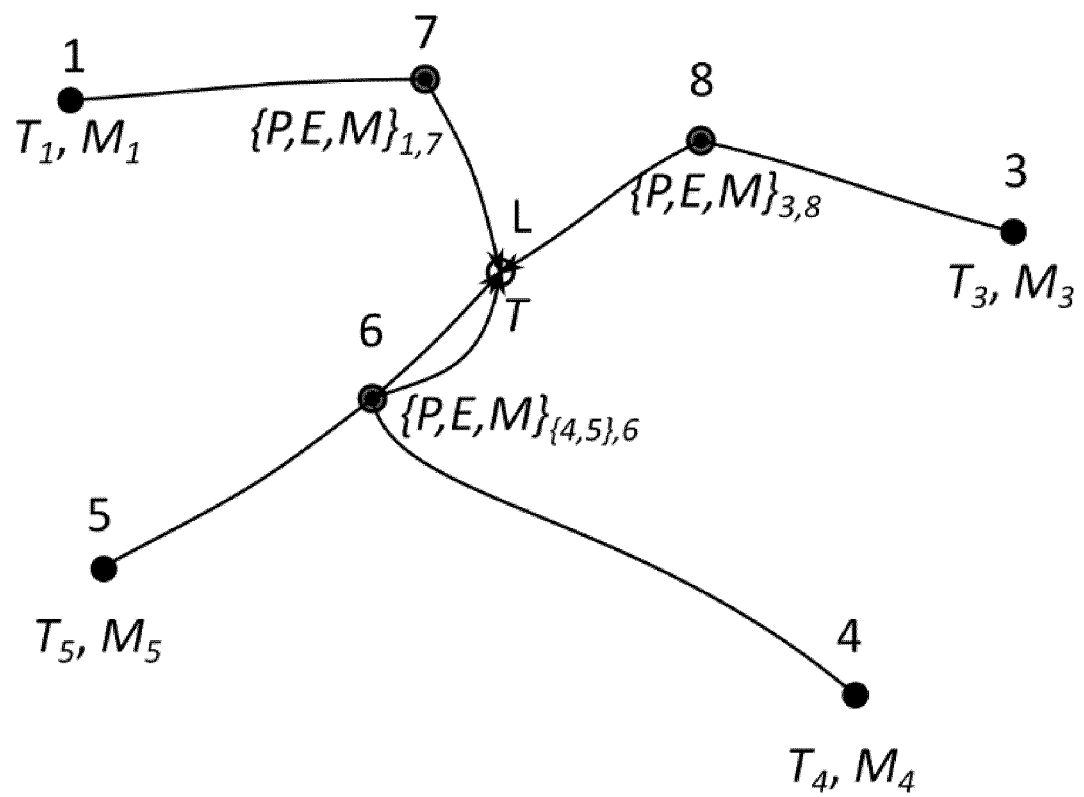
FIG. 9 illustrates an example of a generation of an image based on mesh and texture map data.

In other embodiments, the output image may be based on multiple reference anchors but via different relative anchors. In such an embodiment, multiple predicted/relative anchors j may be generated based on the multiple reference anchors. In many such embodiments, each relative anchor is generated from only a single reference anchor as this may result in reduced complexity. Such an example is illustrated in FIG. 8.

Of course, more generally, any combination of using one or more reference anchors to generate each relative anchor and using one or more relative anchors (as well as optionally reference anchors) to generate the output image may be used. Such an example is illustrated in FIG. 8.

An advantage of combining/intersecting meshes is that it may allow coarser meshes to be used thereby reducing the data rate needed to communicate these. Indeed, as long as meshes are reasonably coarse, it is in typical implementations the vertex shader rather than the fragment shader which determines the overall complexity. Based on this consideration it may in some scenarios be attractive to intersect the meshes; forming a larger mesh with little or no coding and processing.

For example, a relative anchor may be generated by the decoder according to the following approach:

1. Multiple reference anchors $(T_i, M_i)$ are warped to a predicted anchor j $(T_{i,j}, M_{i,j})$,
2. Textures are merged to form the texture prediction $P_j$
3. A residue is added to form the texture $T_j=P_j+E_j$
4. In some scenarios, there may also be a dense depth map $D_j$ based on confidence-based blending of the input meshes and optionally corrected with a residue $F_j$
5. The meshes are intersected to form one mesh $M_j$=intersect$_t(M_{i,j})$. It is beneficial to have an intersection method that is based on meshes only but in general it might also rely on textures, in which case the mesh is only available after fragment shading.

The mesh intersection may be implemented according to this algorithm:
1. Start with all meshes as one disjoint graph
2. Optionally add a regular mesh to make sure that the entire viewport (T) is covered. In some cases, the depth values of this mesh have to be determined from the other meshes, and in that case it may make sense to first intersect the other meshes, then intersect the result with the regular mesh.
3. For each pair of intersecting edges $e_{12}$ and $e_{34}$ that intersect in 2-D sense,
   a. Add a vertex $v_5$ at the intersection. There are multiple methods to determine the depth (or disparity) component:
      i. Interpolate from (the vertices that form the) shortest edge
      ii. Preferred: Interpolate from most confident edge, where confidence can for instance be lower when the warped edge is stretched longer than the original
      iii. The average of both edges
      iv. Fetch value from dense depth map $D_j$.
   b. Remove edges $e_{12}$ and $e_{34}$
   c. Add edges $e_{i5}$ for i in 1 . . . 4
4. Because the mesh intersection algorithm is deterministic it is possible to add a residue as described before. For instance, it is possible to correct some depth values using a table of vertex indices and values.

In some embodiments, the mesh processor 203 may be arranged to filter the mesh generated for the first viewpoint, i.e. the relative mesh.

Indeed, when at depth jumps, meshes perfectly align with texture information, visible stretching can occur when rendering a synthetic viewpoint. This can be avoided by making the meshes fit more loosely around foreground objects. When working with dense depth maps, this operation is performed by a morphological operation. For meshes, this can be performed by migrating vertices in the direction of the gradient of the depth field (towards increased distance from the virtual camera position).

The amount of filtering is significant since if too much filtering is applied the background will tend to be mixed with the foreground, resulting in potentially this being visible as a halo, especially with background motion.

In some embodiments, the image signal may be arranged to include metadata indicative of a filtering to be applied. For example, the image signal may specify (per file, stream, mesh and/or vertex) how much filtering should be applied. This value could be in spatial units (e.g. pixels) in which case only the direction of the depth gradient is taken into account, or it could be in depth or disparity units in which case also the magnitude of the depth gradient is taken into account.

This filtering is preferably applied prior to adding any mesh residue (i.e. before combining a relative mesh and corresponding mesh residual data) so that the residue serves as a correction on both the warping and the filtering.

The image signal may typically comprise metadata (i.e. data about other data of the image signal) that may facilitate the processing of the image signal. Specifically, the image signal may as previously described comprise a plurality of residual data texture maps for different pairings of reference viewpoints and residual viewpoints. The image signal may further comprise metadata which is indicative of which 3D images of the image signal are linked to which residual data texture maps of the image signal. The decoder may extract this metadata and proceed to select the appropriate residual data texture maps and reference images when generating the texture map for a given relative anchor.

In many embodiments, the image signal may additionally or alternatively comprise mesh generation control data and the mesh processor 203 may be arranged to generate the relative mesh(es) in response to the mesh generation control data.

For example, as described above the mesh generation control data may comprise data specifying the filtering that should be applied to the generated intermediate mesh. This allows the encoder to control the filtering such that this can be adapted based on the actual image properties, and indeed this consideration can be made based on e.g. comparisons with the original mesh that may have been received for the given relative viewpoint.

The approach may also allow for the mesh generation control data to provide different control data for different relative viewpoints and/or for different reference viewpoints. Thus, it may allow for dissimilar anchors to be treated differently. For example, mesh generation control data may be provided which comprises the following:
   A field to indicate for each predicted anchor how the mesh should be formed, choosing between a number of available choices, e.g.:
      Regular mesh
      Mesh from nearest anchor
      Mesh from anchor i
      Mesh intersection
      etc.
   Fields to indicate how many and which reference anchors are to be used per predicted anchor.

The apparatus of FIG. 2 may accordingly comprise a receiver (201) for receiving an image signal comprising a number of three dimensional images representing a scene from different viewpoints, each three dimensional image comprising a mesh and a texture map, the signal further comprising a residual data texture map for a first viewpoint being different from the different viewpoints of the number of three dimensional images, the residual data texture map providing residual data for a texture map for the first viewpoint relative to a texture map resulting from a viewpoint shift of a reference texture map being a texture map of a first three dimensional image of the number of three dimensional images; a mesh processor (203) for generating a first mesh for the first viewpoint; a first texture processor (205) for generating an intermediate texture map in response to a viewpoint transformation of the reference texture map from a viewpoint of the first three dimensional image to the first viewpoint; a second texture processor (207) for generating a first texture map in response to a combination of the intermediate texture map and the residual data texture map; and an image generator (209) for generating an image for a second viewpoint from the first texture map and the first mesh.

Further, the image signal may specifically comprise a plurality of residual data texture maps for the first viewpoint, the plurality of residual data texture maps including the residual data texture map for the first view point; and the mesh processor (203) may be arranged to further generate a second mesh for the first viewpoint from an additional reference mesh being a mesh of a second three dimensional image of the plurality of three dimensional images; the first texture processor (205) may be arranged to generate an additional intermediate texture map in response to a viewpoint transformation of an additional reference texture map from a viewpoint of the second three dimensional image to the first viewpoint, the additional reference texture map being a texture map of the second three dimensional image; the second texture processor (207) may be arranged to generate a second texture map in response to a combination of the additional intermediate texture map and an additional residual data texture map for the first viewpoint, the additional residual data texture map being for the second three dimensional image; and the image generator (209) may be arranged to further generate the image for the second viewpoint from the second texture map and the second mesh.

The viewpoints for which the specific approach may be used will depend on the requirements and preferences of the individual embodiment. In many embodiments, the approach will be used to generate images for virtual viewpoints in a scene that are determined locally e.g. based on a user input or movement (e.g. to provide a virtual reality experience).

However, it is respectfully submitted that the approach is not limited to such embodiments and that practical implementations based on e.g. viewpoint information being included in the same signal as the scene data could be used. For example, the signal may in addition to the described scene data comprise indications of preferred, mandatory, or suggested viewpoints and the apparatus may use the defined approach to generate images for these viewpoints.

Indeed, as an example, it is even conceivable that the approach can be used to locally generate an image for one reference viewpoint based on another reference viewpoint and relative viewpoint. Such an image could e.g. be compared to a corresponding image generated directly from the mesh and texture of the first reference viewpoint. If the difference is less than a given amount, the system may decide that the mesh and texture map for the first reference viewpoint can be discarded and a new signal can be generated without this information. Thus, the apparatus can use the defined approach to perform a transcoding/data rate reduction.

Typically the second viewpoint will be closer to the first viewpoint than to the original reference viewpoint, this is by no means necessary. For example, the original reference viewpoint may be just to the right of a foreground object that occludes a large background section. The desired viewpoint (the second viewpoint) may be just to the left of this foreground object and thus the mesh and texture map for the reference viewpoint may not provide sufficient (or any) information for the occluded background section. However, a residual texture map may be provided for a first/relative viewpoint that is substantially to the left of the foreground object and may be substantially further away from the second (desired) viewpoint than the reference viewpoint is. However, generating a texture map and mesh for this first/relative viewpoint may result in much better information that can be used to generate the image for the second viewpoint (it will have information on the large background section that is occluded from the reference viewpoint). It is noted that this will be the case even if the first/relative viewpoint data is based on the reference viewpoint as the residual texture map will comprise the information for the background section occluded by the foreground object from the reference viewpoint.

It will be appreciated that many different examples can be envisaged and that the preferred approach and implementation will depend on the individual requirements and preferences of the individual embodiment (including e.g. details of the scene, the data rate, etc).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating an image, the apparatus comprising:
   a receiver,
   wherein the receiver is arranged to receive an image signal,
   wherein the image signal comprises a plurality of three dimensional images, and a plurality of residual data texture maps for a first viewpoint,
   wherein the a plurality of three dimensional images represents a scene from a plurality of viewpoints,
   wherein each three dimensional image comprises a reference mesh and a reference texture map, wherein the plurality of three dimensional images comprises a first three dimensional image and a second three dimensional image, wherein the first three dimensional image comprises a first reference mesh and a first reference texture map, wherein the second three dimensional image comprises a second reference mesh and a second reference texture map, wherein the first viewpoint is different from the plurality of viewpoints, wherein a first residual data texture map of the plurality of residual data texture maps provides residual data for a first viewpoint texture map relative to a first viewpoint shift texture map, wherein the first viewpoint shift texture map results from a viewpoint shift of the first reference texture map, wherein a second residual data texture map of the plurality of residual texture maps provides residual data for the first viewpoint texture map relative to a second viewpoint shift texture map, wherein the second viewpoint shift texture map results from a viewpoint shift of the second reference texture map;

a mesh processor, wherein the mesh processor is arranged to generate a first mesh for the first viewpoint, wherein the mesh processor is arranged to generate a second mesh for the first viewpoint from the second reference mesh;

a first texture processor, wherein the first texture processor is arranged to generate a first intermediate texture map in response to a viewpoint transformation of the first reference texture map from a viewpoint of the first three dimensional image to the first viewpoint, wherein the first texture processor is arranged to generate a second intermediate texture map in response to a viewpoint transformation of the second reference texture map from a viewpoint of the second three dimensional image to the first viewpoint;

a second texture processor, wherein the second texture processor is arranged to generate a first texture map in response to a combination of the first intermediate texture map and the first residual data texture map, wherein the second texture processor is arranged to generate a second texture map in response to a combination of the second intermediate texture map and the second residual data texture map; and an image generator, wherein the image generator is arranged to generate an image for a second viewpoint from the first texture map, the first mesh, the second texture map, and the second mesh.

2. The apparatus of claim 1, wherein the image signal further comprises mesh residual data for a mesh for the first viewpoint with reference to a reference mesh, wherein the reference mesh is a mesh of the first three dimensional image, wherein the mesh processor is arranged to generate the first mesh in response to the mesh residual data and the reference mesh.

3. The apparatus of claim 2, wherein the mesh residual data comprises residual data for only a subset of vertices of the first mesh.

4. The apparatus of claim 1, wherein the image signal comprises no mesh data for the first viewpoint.

5. The apparatus of claim 1, wherein the image signal comprises mesh generation control data, wherein the mesh processor is arranged to generate the first mesh in response to the mesh generation control data.

6. The apparatus of claim 1, wherein the image signal comprises metadata indicative of three dimensional images linked to the plurality of residual data texture maps.

7. The apparatus of claim 1, wherein the image generator is arranged to generate a first intermediate image for the second viewpoint in response to the first texture map and the first mesh, wherein the image generator is arranged to generate a second intermediate image for the second viewpoint in response to an additional texture map and an additional mesh for an additional viewpoint, wherein the image generator is arranged to generate the image by combining the first intermediate image and the second intermediate image.

8. The apparatus of claim 1, wherein the image generator is arranged to generate a first intermediate image for the second viewpoint in response to a viewpoint transformation from the first viewpoint to the second viewpoint based on the first texture map and the first mesh, wherein the image generator is arranged to generate a second intermediate image for the second viewpoint in response to a viewpoint transformation from the first viewpoint to the second viewpoint based on the second texture map and the second mesh, wherein the image generator is arranged to generate the image by combining the first intermediate image and the second intermediate image.

9. The apparatus of claim 8, wherein the image generator is arranged to combine the first intermediate image and the second intermediate image in response to occlusion data associated with a viewpoint of at least the first three dimensional image.

10. The apparatus of claim 8, wherein the image generator is arranged to combine the first intermediate image and the second intermediate image in response to occlusion data associated with a viewpoint of least the second three dimensional image.

11. The apparatus of claim 1, wherein the image generator is arranged to combine the first texture map and the second texture map into a third texture map for the first viewpoint, wherein the image generator is arranged to combine the first mesh and the second mesh into a third mesh for the first viewpoint, wherein the image generator is arranged to generate the image in response to a viewpoint transformation from the first viewpoint to the second viewpoint based on the third texture map and the third mesh.

12. The apparatus of claim 1, wherein the image signal comprises mesh generation control data, wherein the mesh processor is arranged to generate the first mesh in response to the mesh generation control data.

13. An apparatus for generating an image signal, the apparatus comprising:

a receiver, wherein the receiver is arranged to receive a plurality of three dimensional images, wherein the a plurality of three dimensional images represents a scene from a plurality of viewpoints,
wherein each three dimensional image comprises a reference mesh and a reference texture map,
wherein the plurality of three dimensional images comprises a first three dimensional image and a second three dimensional image,
wherein the first three dimensional image comprises a first reference mesh and a first reference texture map,
wherein the second three dimensional image comprises a second reference mesh and a second reference texture map,
wherein the receiver is arranged to receive a first texture map for a first viewpoint,
wherein the first viewpoint is different from the plurality of viewpoints;
a view shift processor,
wherein the view shift processor is arranged to generate a first intermediate texture map in response to a viewpoint transformation of the first reference texture map,
wherein the view shift processor is arranged to generate a second intermediate texture map in response to a viewpoint transformation of the second reference texture map;
a residual processor,
wherein the residual processor is arranged to generate a first residual data texture map in response to a comparison of the first intermediate texture map and the first texture map,
wherein the residual processor is arranged to generate a second residual data texture map in response to a comparison of the second intermediate texture map and the first texture map,
wherein the first residual data texture map is indicative of a difference between the first intermediate texture map and the first texture map,
wherein the second residual data texture map is indicative of a difference between the second intermediate texture map and the first texture map; and
a signal generator,
wherein the signal generator is a arranged to generate the image signal to comprise the plurality of three dimensional images, the first residual data texture map, and the second residual data texture map.

14. A method of generating an image, the method comprising:
receiving an image signal, the image signal comprising:
a plurality of three dimensional images;
a plurality of residual data texture maps for a first viewpoint;
a first residual data texture map of the plurality of residual data texture maps; and
a second residual data texture map of the plurality of residual data texture maps,
wherein the a plurality of three dimensional images represents a scene from a plurality of viewpoints,
wherein each three dimensional image comprises a reference mesh and a reference texture map,
wherein the plurality of three dimensional images comprises a first three dimensional image and a second three dimensional image,
wherein the first three dimensional image comprises a first reference mesh and a first reference texture map,
wherein the second three dimensional image comprises a second reference mesh and a second reference texture map,
wherein the first viewpoint is different from the plurality of viewpoints,
wherein the first residual data texture map of the plurality of residual data texture maps provides residual data for a texture map for the first viewpoint relative to a texture map resulting from a viewpoint shift of first reference texture map,
wherein the second residual data texture map of the plurality of residual data texture maps provides residual data for a texture map for the first viewpoint relative to a texture map resulting from a viewpoint shift of the second reference texture map;
generating a first mesh for the first viewpoint;
generating a second mesh for the first viewpoint from the second reference mesh;
generating a first intermediate texture map in response to a viewpoint transformation of the first reference texture map from a viewpoint of the first three dimensional image to the first viewpoint;
generating a second intermediate texture map in response to a viewpoint transformation of the second reference texture map from a viewpoint of the second three dimensional image to the first viewpoint;
generating a first texture map in response to a combination of the first intermediate texture map and the first residual data texture map
generating a second texture map in response to a combination of the second intermediate texture map and the second residual data texture map; and
generating an image for a second viewpoint from the first texture map, the first mesh, the second texture map, and the second mesh.

15. The method of claim 14,
wherein the image signal further comprises mesh residual data for a mesh for the first viewpoint with reference to a reference mesh,
wherein the reference mesh is a mesh of the first three dimensional image,
wherein the first mesh is generated in response to the mesh residual data and the reference mesh.

16. The method of claim 15, wherein the mesh residual data comprises residual data for only a subset of vertices of the first mesh.

17. The method of claim 14, wherein the image signal comprises no mesh data for the first viewpoint.

18. The method of claim 14, wherein the image signal comprises metadata indicative of three dimensional images linked to the plurality of residual data texture maps.

19. A method of generating an image signal, the method comprising:
receiving a plurality of three dimensional images and a first texture map,
wherein the a plurality of three dimensional images represents a scene from a plurality viewpoints,
wherein each three dimensional image comprises a reference texture map,
wherein the plurality of three dimensional images comprises a first three dimensional image and a second three dimensional image,
wherein the first three dimensional image comprises a first reference mesh and a first reference texture map,
wherein the second three dimensional image comprises a second reference mesh and a second reference texture map,
wherein the first texture map is for a first viewpoint,
wherein the first viewpoint is different from the plurality viewpoints of the three dimensional images;

generating a first intermediate texture map in response to a viewpoint transformation of the first reference texture map from the first three dimensional image of the plurality of three dimensional images to the first viewpoint,
generating a second intermediate texture map in response to a viewpoint transformation of the second reference texture map from the second three dimensional image of the plurality of three dimensional images to the first viewpoint;
generating a first residual data texture map in response to a comparison of the first intermediate texture map and the first texture map;
generating a second residual data texture map in response to a comparison of the second intermediate texture map and the first texture map,
wherein the first residual data texture map is indicative of a difference between the first intermediate texture map and the first texture map,
wherein the second residual data texture map is indicative of a difference between the second intermediate texture map and the first texture map; and
generating the image signal to comprise the plurality of three dimensional images, the first residual data texture map, and the second residual data texture map.

* * * * *